(12) United States Patent
Niekawa

(10) Patent No.: US 8,215,748 B2
(45) Date of Patent: Jul. 10, 2012

(54) INK-JET RECORDING DEVICE AND INK-JET RECORDING METHOD

(75) Inventor: Yukihiro Niekawa, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 394 days.

(21) Appl. No.: 12/664,750

(22) PCT Filed: Jun. 11, 2008

(86) PCT No.: PCT/JP2008/060662
§ 371 (c)(1),
(2), (4) Date: Dec. 15, 2009

(87) PCT Pub. No.: WO2008/156017
PCT Pub. Date: Dec. 24, 2008

(65) Prior Publication Data
US 2010/0141695 A1    Jun. 10, 2010

(30) Foreign Application Priority Data

Jun. 19, 2007 (JP) ................................. 2007-161363

(51) Int. Cl.
*B41J 2/15* (2006.01)
*B41J 2/145* (2006.01)
(52) U.S. Cl. .............................................. 347/41; 347/8
(58) Field of Classification Search .................. 347/41
See application file for complete search history.

(56) References Cited

U.S. PATENT DOCUMENTS

| | | | |
|---|---|---|---|
| 5,917,520 A | 6/1999 | Koujiyama et al. | |
| 5,929,876 A | 7/1999 | Bartolome | |
| 6,206,502 B1 * | 3/2001 | Kato et al. | 347/41 |
| 2005/0007416 A1 | 1/2005 | Takekoshi | |

FOREIGN PATENT DOCUMENTS

| | | |
|---|---|---|
| EP | 0 761 453 A1 | 3/1997 |
| EP | 0 992 937 A2 | 4/2000 |
| JP | 9-216350 A | 8/1997 |
| JP | 2002-036515 A | 2/2002 |
| JP | 2006-062375 | 3/2006 |

OTHER PUBLICATIONS

English Language International Search Report dated Sep. 16, 2008 issued in parent Appln. No. PCT/JP2008/060662.
Extended European Search Report (EESR) dated Nov. 30, 2011 (in English) in counterpart European Application No. 08765441.4.

* cited by examiner

*Primary Examiner* — Uyen Chau N Le
*Assistant Examiner* — Chad Smith
(74) *Attorney, Agent, or Firm* — Holtz, Holtz, Goodman & Chick, PC

(57) ABSTRACT

An ink-jet recording device capable of recording an image with no conspicuous joint line between bands each being formed by multiple horizontal scanning. A band having a width corresponding to a predetermined amount M of movement is formed by (n+1)-times record scanning. The ink-jet recording device has a controller which allows a second group of nozzles to perform recording at the time of the (n+l)+lth horizontal scanning and beyond where the relations $L=M \times (n+1)+a$ and $M>a$ are satisfied, where L is a row length of all the nozzles of a recording head and $\alpha$ is a low length of a second group of nozzles and allocate recording data to each of the nozzles so that the border in the region recorded by the horizontal scanning on the upstream side of the relative vertical scanning direction may be formed within the width of the band formed by the first to (n+l)-th horizontal scanning.

16 Claims, 9 Drawing Sheets

1ST PATH

2ND PATH

3RD PATH

4TH PATH

5TH PATH

6TH PATH

INK-JET RECORDING DEVICE AND INK-JET RECORDING METHOD

This application is a U.S. National Phase Application under 35 USC 371 of International Application PCT/JP2008/060662 filed Jun. 11, 2008.

TECHNICAL FIELD

The present invention relates to an ink-jet recording device and an ink-jet recording method, and particularly to the ink-jet recording device and the ink-jet recording method in which recording is performed by forming a band by plural times of scanning with a recording head.

BACKGROUND TECHNOLOGY

As a recording apparatus which can cope with various-kinds and small-quantity needs on a case-by-case basis, a recording apparatus of inkjet system (herein after referred as an ink-jet recording device) has been commonly known. The ink-jet recording device ejects an ink from a nozzle provided in a recording head on a face opposing to a recording medium, attaches and fixes the ink on the recording medium to record an image on the recording medium. Differently from a gravure printing or frexo printing, the ink-jet recording device does not require a plate making process and is easily and promptly able to cope with the small-quantity needs. Further, the inkjet recording system has merits of causing small noises, and being able to easily perform a color image recording by using multiple color inks.

As one type of the ink-jet recording device, in an ink-jet recording device which performs a recording while scanning the recording head in a horizontal scanning direction (or main scanning direction) which is perpendicular to the vertical scanning direction (or sub-scanning direction) of conveying the recording medium, the ink-jet recording device is known which creates a band by plural times of scanning in the horizontal scanning direction with a recording head, where "a band" is a region corresponding to a moving amount in the vertical scanning direction of the recording medium by the plural times of horizontal scanning.

However, in such case of forming a band by the multiple times of horizontal scanning, sometimes caused is a joint belt-like line formed along the border portions between the bands. In the case where the joint belt-like line is conspicuous, the image quality is degraded.

In this regard, particularly in the conventional ink-jet recording device using a water-based ink, a method is invented to make the joint belt-like line inconspicuous wherein the ink ejection rate from a nozzle line arranged in the end portion of the recording head is made low, compared with the ink ejection rate from a nozzle arranged in the central portion (for example, refer to Patent Document 1: Japanese Unexamined Patent Application Publication 2002-36515, and Patent Document 2: Japanese Unexamined Patent Application Publication 2006-62375.

DISCLOSURE OF THE INVENTION

Problems to be Solved by the Invention

In recent years, ink-jet recording devices which can cope with various recording media are known. For example, an ink-jet recording device is known which utilizes a photocurable ink containing a photo-initiator having a prescribed sensitivity to light such as ultraviolet light, and hardens the ink to fix on the medium by irradiating the light on the ink attached on the recording medium. In a case of an ink-jet recording device which hardens the ink by irradiating activation energy ray, such as the above ink-jet recording device using the photocurable ink, the ink ejected onto the recording medium is not absorbed in the recording medium, and is hardened and fixed on the surface of the recording medium. In the case of this type of recording method, if there is a time difference between the completion time of recording a band and the starting time of recording at the adjoining band, the join belt-like line becomes more conspicuous due to the time difference of hardening timing of the ink.

Further, in the case where, as described in Patent Document 1 and Patent Document 2, the ink ejection rate of the end portion of the recording head is lowered compared to that of central portion of the recording head, at the last scanning of forming each band, the ink density (ink quantity) at region recorded by the end portion of the recording head is different from the ink density (ink quantity) at region recorded by the central portion of the recording head. In this case, different from the case of using the water-based ink, a belt like pattern of different glossiness becomes more conspicuous, due to the reason that, if the ink density in a region is different, the hardening condition at the time of irradiating the activation energy ray becomes different.

The present invention is achieved to solve the above problems, and to provide an ink-jet recording device and an ink-jet recording method which performs a high quality image recording by making the joint belt-like line inconspicuous, in the case of forming a band by multiple times of horizontal scanning in the serial method.

Means for Solving the Problems

An ink-jet recording device of the present invention to solve the above-mentioned problems includes:

a recording head, for ejecting an ink onto a recording medium, configured with a first group of nozzles and a second group of nozzles positioned at an end portion of the recording head, each of the first and second groups of nozzles being provided with a plurality of nozzles arranged in rows along a vertical scanning direction;

a horizontal scanning device which causes the recording head to scan in a horizontal scanning direction perpendicular to the vertical scanning direction; and a vertical scanning device which causes at least one of the recording medium or the recording head to relatively scan in the vertical scanning direction by a predetermined amount of movement M;

wherein the ink-jet recording device alternately executes the horizontal scanning by the horizontal scanning device and the vertical scanning by the vertical scanning device, and by multiple times of the horizontal scanning and the vertical scanning, forms a band with a width corresponding to the predetermined amount of movement M by the first group of nozzles, to record on the recording medium, wherein the horizontal scanning device executes (n+1) times of scanning for forming one band, in cases where a required number of scanning times for forming the one band is n, and the relations $L=M \times (n+1)+\alpha$, and $M > \alpha$ are satisfied, where L is a row length of all the nozzles, and $\alpha$ is a row length of the second group of nozzles, and the ink-jet recording device further comprises a controller which causes the second group of nozzles to execute recording at the time of horizontal scanning of $\{(n+1)+1\}$th and beyond, and the controller allocates recording data to each of the nozzles so that a border of a region recorded by the horizontal scanning of the second group nozzles on upstream side of the relative vertical scanning direction of the recording head relative to the recording medium is formed in an intermediate portion of the width of the one band formed by the first to (n+1)th horizontal scanning.

Another ink-jet recording device of the present invention to solve the above-mentioned problems includes:

a recording head, for ejecting an ink onto a recording medium, configured with a first group of nozzles and a second group of nozzles positioned at an end portion of the recording head, each of the first and second groups of nozzles being provided with a plurality of nozzles arranged in rows along a vertical scanning direction;

a horizontal scanning device which causes the recording head to scan in a horizontal scanning direction perpendicular to the vertical scanning direction; and a vertical scanning device which causes at least one of the recording medium or the recording head to relatively scan in the vertical scanning direction by a predetermined amount of movement M;

wherein the ink-jet recording device alternately executes the horizontal scanning by the horizontal scanning device and the vertical scanning by the vertical scanning device, and by multiple times of the horizontal scanning and the vertical scanning, forms a band with a width corresponding to the predetermined amount of movement M by the first group of nozzles, to record on the recording medium, wherein in cases where a required number of scanning times for forming the one band is n, and the relations $L=M\times(n+1)+\alpha$, and $M>\alpha$ are satisfied, where L is a row length of all the nozzles, and $\alpha$ is a row length of the second group of nozzles, and the ink-jet recording device further comprises a controller which causes the second group of nozzles to execute recording at the time of horizontal scanning of (n+1)th and beyond, and the controller allocates recording data to each of the nozzles so that a border of a region recorded by the horizontal scanning of the second group nozzles on upstream side of the relative vertical scanning direction of the recording head relative to the recording medium is formed in an intermediate portion of the width of the one band formed by the first to n-th horizontal scanning.

An ink-jet recording method includes:

a vertical scanning process to cause at least one of a recording medium or a recording head to relatively scan in a vertical scanning direction by a predetermined amount of movement M;

a horizontal scanning process to cause the recording head to scan in a horizontal scanning direction perpendicular to the vertical scanning direction; and a recording process to eject ink from a first group of nozzles, and a second group of nozzles positioned at an end portion of the recording head, each of the first and second groups of nozzles being provided with a plurality of nozzles in rows along a vertical scanning direction, and to alternately execute the horizontal scanning by a horizontal scanning device and the vertical scanning by a vertical scanning device, and by multiple times of the horizontal scanning and the vertical scanning, to form one band with a width corresponding to the predetermined amount of movement M by a first group of nozzles, to record on the recording medium, wherein in the horizontal scanning process, (n+1) times of scanning is executed for forming the one band, in cases where required number of scanning times for forming the one band is n, and the relations $L=M\times(n+1)+\alpha$, and $M>\alpha$ are satisfied, where L is a row length of all the nozzles, and $\alpha$ is a row length of the second group of nozzles, and wherein in the recording process, the second group of nozzles executes the recording at the time of horizontal scanning of {(n+1)+1}th and beyond, and recording data is allocated to each of the nozzles so that a border of a region recorded by the horizontal scanning of the second group nozzles on upstream side of the relative vertical scanning direction of the recording head relative to the recording medium is formed in an intermediate portion of the width of the one band formed by the first to (n+1)th horizontal scanning.

Another ink-jet recording method includes:

a vertical scanning process to cause at least one of a recording medium or a recording head to relatively scan in a vertical scanning direction by a predetermined amount of movement M;

a horizontal scanning process to cause the recording head to scan in a horizontal scanning direction perpendicular to the vertical scanning direction; and a recording process to eject ink from a first group of nozzles, and a second group of nozzles positioned at an end portion of the recording head, each of the first and second groups of nozzles being provided with a plurality of nozzles in rows along a vertical scanning direction, and to alternately execute the horizontal scanning by a horizontal scanning device and the vertical scanning by a vertical scanning device, and by multiple times of the horizontal scanning and the vertical scanning, to form one band with a width corresponding to the predetermined amount of movement M by a first group of nozzles, to record on the recording medium, wherein in cases where required number of scanning times for forming the one band is n, the relations $L=M\times(n+1)+\alpha$, and $M>\alpha$ are satisfied, where L is a row length of all the nozzles, and $\alpha$ is a row length of the second group of nozzles, and in the recording process, the second group of nozzles executes the recording at the horizontal scanning of (n+1)th and beyond, and recording data is allocated to each of the nozzles so that a border of a region recorded by the horizontal scanning on an upstream side of the relative vertical scanning direction of the recording head relative to the recording medium is formed in an intermediate portion of a width of the one band formed by the first to n-th horizontal scanning.

Effect of the Invention

According to the invention described in claims 1 and 8, in cases where required number of scanning times for forming the a band is n, by executing (n+1) times of scanning for forming the one band, the region recorded by the second group of nozzles can be shifted by the amount corresponding to one horizontal scanning. By this, the recording by the second group of nozzles can be performed at more proper position.

Although in cases where a hardening timings of the ink are different by each band, joint belt-like line arises at the border portion of the band, according to the present invention, at the time of no less than {(n+1)+1}th horizontal scanning, the vertical scanning device executes the recording on a region where the length in the vertical scanning direction (length of the nozzle row of the second nozzle group) is smaller than the amount of movement M by the vertical scanning device, such that the border in the region recorded by the horizontal scanning on the upstream side of the relative vertical scanning direction of the inkjet head relative to the recording medium is formed in an intermediate portion of the width of the band formed by the $1^{ST}$ to (n+1)th horizontal scanning. Due to this, even if there is a time difference between the starting time or finishing time of recording a certain band and the starting time or finishing time of recording at the adjoining band, the effect can be attained that the join belt-like line can be made inconspicuous.

According to the invention described in claim 2, the pixel to be recorded by the second group of nozzles is not recorded by 1 through (n+1)-th horizontal scanning, thus the overlapping of inks is not caused at the portion, and the effect of realizing the high quality image recording is attained.

According to the invention described in claim 3, since the pixel to be recorded by the second group of nozzle is restricted to the pixels in the upstream side in the relative vertical scanning direction than the border of the downstream side of the band formed by 1 through (n+1)th horizontal scanning in the relative vertical scanning direction, the overlapped recording is not used in vain and the effect of realizing the high quality image recording is attained by effectively preventing the generation of conspicuous joint belt-like line.

According to the invention described in claim 4, in cases where a number of scanning times n required for forming the one band is an even number, and the recording data is not allocated in order not to eject ink to the nozzles positioned in different end portions of the recording head according to the recording operation of outward scanning or the recording operation of homeward scanning. According to this, the generation of joint line is prevented, the combination of scanning direction for every band is made coincident, and generation of uneven image of banding, which is caused by the difference of hue, density or grossness due to the difference of ink ejection order, time for drying, timing of irradiating the activation energy ray by each band etc., can be prevented and a high quality image can be formed.

According to the invention described in claim 5, in cases where a number of scanning times n required for forming the one band is an odd number, and the recording data is not allocated in order not to eject ink to the nozzles positioned in both end portions of the recording head in one of the recording operation of outward scanning or the recording operation of homeward scanning. According to this, the generation of joint line is prevented, the combination of scanning direction for every band is made coincident, and generation of uneven image of banding, which is caused by the difference of hue, density or grossness due to the difference of ink ejection order, time for drying, timing of irradiating the activation energy ray by each band etc., can be prevented and a high quality image can be formed.

According to the invention described in claim 6 and claim 9, the second group of nozzles executes recording at the time of horizontal scanning of (n+1)th and beyond, to record in an area whose length in the vertical scanning direction (length of the nozzle row of the second group of nozzles) is smaller than the amount of movement M of the vertical scanning device, so that a border of a region recorded by the horizontal scanning of the second group nozzles on upstream side of the relative vertical scanning direction of the inkjet head relative to the recording medium is formed in an intermediate portion of the width of the one band formed by the first to n-th horizontal scanning. Although the joint line is generated at the border portion of the bands when hardening timing is different by each band, according to the present invention, by executing the recording by the second group of nozzles, the joint line generated at the border of bands can be made inconspicuous, even in cases where time difference is generated between the time of starting record or completion of record for a certain band and the time of starting record or completion of record for the band adjoining to the certain band.

According to the invention described in claim 7, since the ink is the activation energy hardening type ink, recording on various types of recording media is made possible. Even in the case where this type of ink is utilized to record the image, generation of joint line, which is caused by the difference of irradiation timing of the activation energy ray, can be prevented and a high quality image can be formed.

BRIEF DESCRIPTION OF THE DRAWINGS

FIGS. 4a-4f show the pixels to be recorded respectively in the first to 6th path.

EXPLANATION OF SYMBOLS

Figure 1:
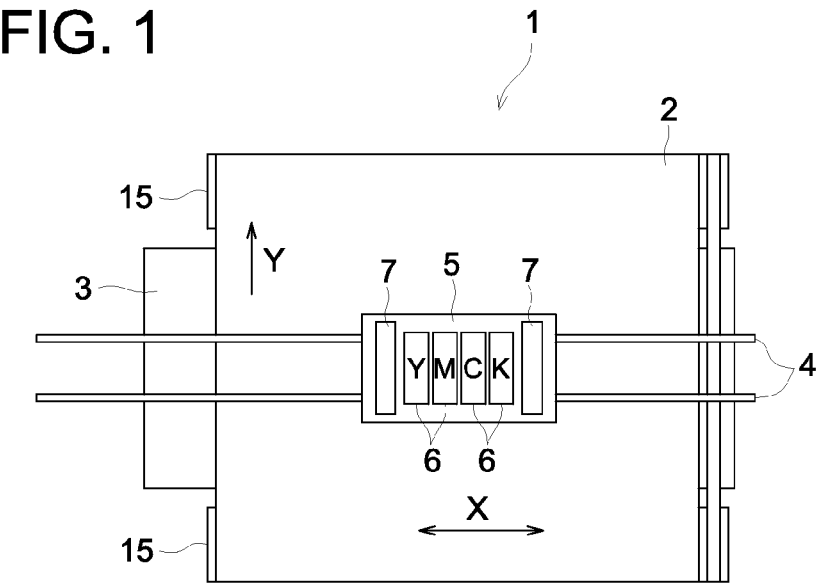
FIG. 1 is a plan view illustrating main configurations of an ink-jet recording device of the first embodiment relating to the present invention.

1. Ink-jet recording device
2. Recording medium
6. Recording head
7. UV ray exposure device
10. Controller
11. Carriage drive mechanism (horizontal scanning device)
12. Recording medium conveyance mechanism (vertical scanning device)
61. Nozzle
62. Ink ejection surface
X. Horizontal scanning direction
Y. vertical scanning direction

DETAILED DESCRIPTION OF THE PREFERRED EMBODIMENTS

By referring to FIGS. 1-5, the first embodiment of the ink-jet recording device relating to the present invention will be described below.

In the drawings, an allow mark Y indicates a relative vertical scanning direction Y of recording head 6 with respect to recording medium 2, and will be simply described as vertical scanning direction Y.

As shown in FIG. 1, in the present invention, ink-jet recording device 1 is an ink-jet recording device utilizing a serial print system. In ink-jet recording device 1, provided is a plate-shaped platen 3 which support the recording medium 2 from a non recording surface of the medium.

Above the platen 3, provided is a rod-shaped guide rail 4 extending to the width direction of recording medium 2. Carriage 5 is supported by this guide rail 4, and carriage 5 is movable with reciprocal movement by carriage drive mechanism 11 as a horizontal scanning device along guide rail 4 in the width direction of the recording medium 2 (hereinafter, referred as horizontal scanning direction X).

Further, in ink-jet recording device 1, recording medium conveyance mechanism 12 (FIG. 3) is provided as a vertical scanning device to convey recording medium 2 in the relative vertical scanning direction (the opposite direction to relative vertical scanning direction Y of recording head relative to recording medium 2 indicated in FIG. 1) perpendicular to the horizontal scanning direction X, which is configured of a plurality of conveyance rollers 15. At the time of image recording, the horizontal scanning by carriage drive mechanism 11 and the vertical scanning by recording medium conveyance mechanism 12 are alternately conducted. Recording medium conveyance mechanism 12 conveys the recording medium 2 according to the movement of carriage 5, by a predetermined amount for each horizontal scanning by carriage drive mechanism 11, to the opposite direction to vertical scanning direction toward the downstream side from the upstream side.

As shown in FIG. 1, on carriage 5 four recording heads 6 are installed corresponding to each color of black (K), cyan (C), magenta (M) and yellow (Y), which are utilized in ink-jet recording device 1 of the present embodiment. Each of recording heads 6 is approximately formed in cuboids, and longitudinal side of each recording head 6 is arranged parallel with each other. The inks to be used in ink-jet recording device 1 are not limited to the above, but inks of light yellow (LY), light magenta (LM), light cyan (LC), and transparent ink may be utilized. In this case recording head 6 corresponding to each ink is installed on carriage 5.

Figure 2:
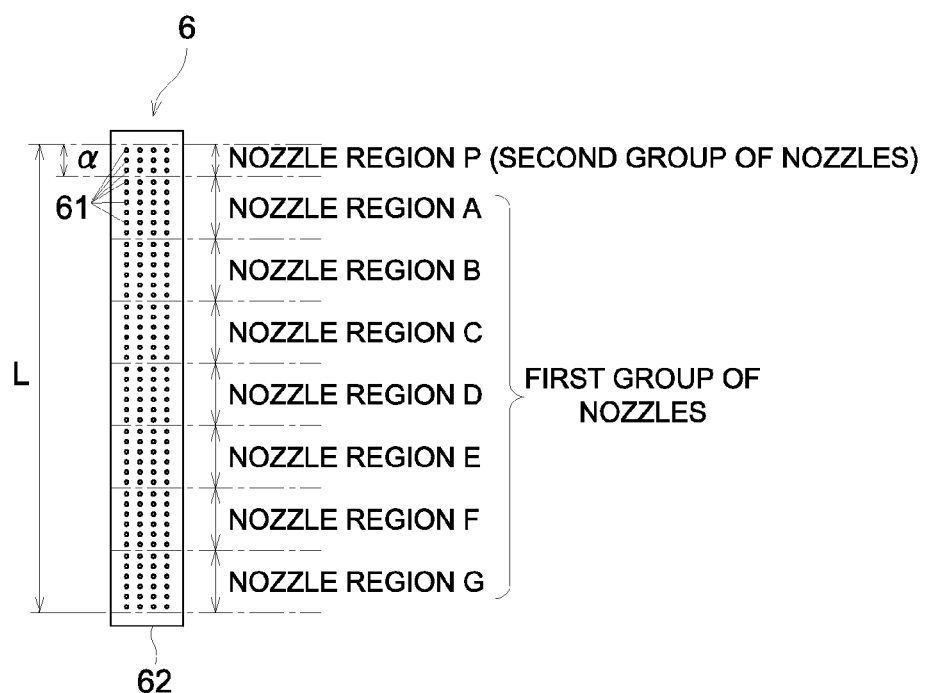
FIG. 2 is a drawing illustrating each nozzle region of a recording head of an ink-jet recording device in the first embodiment.

As shown in FIG. 2, the face of recording head opposing to recording medium 2 is configured of ink ejection face 62 on which a plurality of nozzles 61 are arranged in row along the longitudinal direction of recording head 6 (vertical scanning direction), and each of recording heads 6 ejects the ink from nozzle 61.

In the present embodiment, ink-jet recording device executes a so-called multi path recording. In the multi path recording, nozzles 61 constituting the nozzle row are divided to several blocks, and by allocating recording data to each divided nozzles 61 and intermittently conveying the recording medium 2 by an amount corresponding to the divided one block, the recording is performed so that all pixels composing a region (one band) are filled by a plurality of scanning (n paths). Meanwhile, although the nozzle arrangement may be a strait arrangement or a stagger arrangement, the strait arrangement is exemplified in the present embodiment.

In the present embodiment, number of scanning times n (required number of scanning times for filling the pixels constituting one band) required for forming a single band (a region corresponding to the conveying amount by each horizontal scanning of recording medium 2 in the opposite direction to vertical scanning direction Y) is set to be 6 times (6 paths). The region where nozzles 61 are provided (hereinafter, referred as nozzle region) is, for example as shown in FIG. 2, divided to 8 regions which is greater by 2 than the number of scanning times n required for recording the one band.

Among the regions, the region, where nozzles 61 to be utilized for the main recording to record the band is provided (a first group of nozzles), are set to be 7 regions (nozzle regions A-G), and in the nozzle region (nozzle region P) positioned at the end portion of recording head 6, nozzles 61 of a second group of nozzles, which are utilized for compensation recording to compensate the recording by nozzles 61 arranged in nozzle regions A-G.

Each length of nozzle regions A-G is approximately the same as the width of the one band (a region corresponding to the conveyance amount M by each scanning of recording medium 2 by recording medium conveyance mechanism 12). In the recording head 6, each nozzle is allocated with recording data (drive signals corresponding to the recording data) by controller 10 (refer to FIG. 3) through driving the head drive section 14 (FIG. 3), thus an ink ejection control, such as preventing the ink ejection from nozzles 61 in a certain region, is executed.

In ink-jet recording device of the present embodiment, in the vertical scanning, when conveying recording medium 2 by recording medium conveyance mechanism 12 in the opposite direction to the vertical scanning direction Y, for each horizontal scanning by carriage drive mechanism 11, the conveyance amount is assumed to be M, the number of required scanning times for forming one band to be n, the length of nozzle row of all nozzles 61 in recording head 6 to be L, the length of nozzle row of the second nozzle group to be $\alpha$, wherein the relations: $L=M\times(n+1)+\alpha$, and $M>\alpha$ are satisfied.

Herein, the length of nozzle row L is not limited to the length of the nozzle low in a single recording head. For example, in cases where a plurality of same type of recording heads are arranged in row, the total of the length of nozzle row of the plurality of heads is assumed to be L.

Further, on the both sides of recording heads 6 arranged in a group inside the carriage 5, provided is a UV ray exposure device 7 which irradiates a ultra violet ray as an activation energy ray to harden and fix the ink ejected and attached on recording medium 2.

UV ray exposure device 7 has a source of the UV ray (not illustrated). As the UV ray source, such as a high-pressure mercury lamp, a low-pressure mercury lamp, a metal halide lamp, a semiconductor laser, a cold cathode tube, an eximer lamp, or an LED (light Emitting Diode) can be utilized, without being limited to the exemplified.

Further, the arrangement of UV exposure device is not limited to the above, but each UV exposure device may be arranged between each recording head 6. UV exposure device may also be provided outside of carriage 5, not being limited to inside of carriage 5.

Here, the ink to be used in the present embodiment will be described.

The ink to be used in the present invention is a UV ray curable ink having a property of hardening by exposure to a UV ray as an activation energy ray, and includes, as main components, at least a polymerizable compound (including publicly known compounds), a photo initiator, and a color agent. The above photo curable ink can be divided into two main groups of a radical polymerization ink including radical polymerization compound and a cationic polymerization ink including cationic polymerization compound, and both groups of these inks can be utilized in the present embodiment. Further, a hybrid type ink, which is a complex of the radical polymerization ink and the cationic polymerization ink, may be utilized in the present embodiment. However, since the cationic polymerization ink is good at general versatility because of little or no inhibitory effect of oxygen on polymerization reaction, it is preferable to use the cationic polymerization ink. The cationic polymerization ink is a mixture including at least a cationic polymerization compound such as an oxetane compound, an epoxy compound, or a vinyl ether compound, a cationic light initiator, and a color agent.

As recording medium 2, recording media made of various types of paper such as plain paper, recycled paper, and glossy paper, various types of fabric, various types of unwoven fabric, resin, metal, glass, etc., can be utilized. Further, as a shape of recording medium 2, various types such as roll type, cut-sheet type, plate type can be utilized.

Next, by referring to FIGS. 3 and 4, configurations of a controller of an ink-jet recording device 1 of the first embodiment relating to the present invention will be described.

Figure 3:
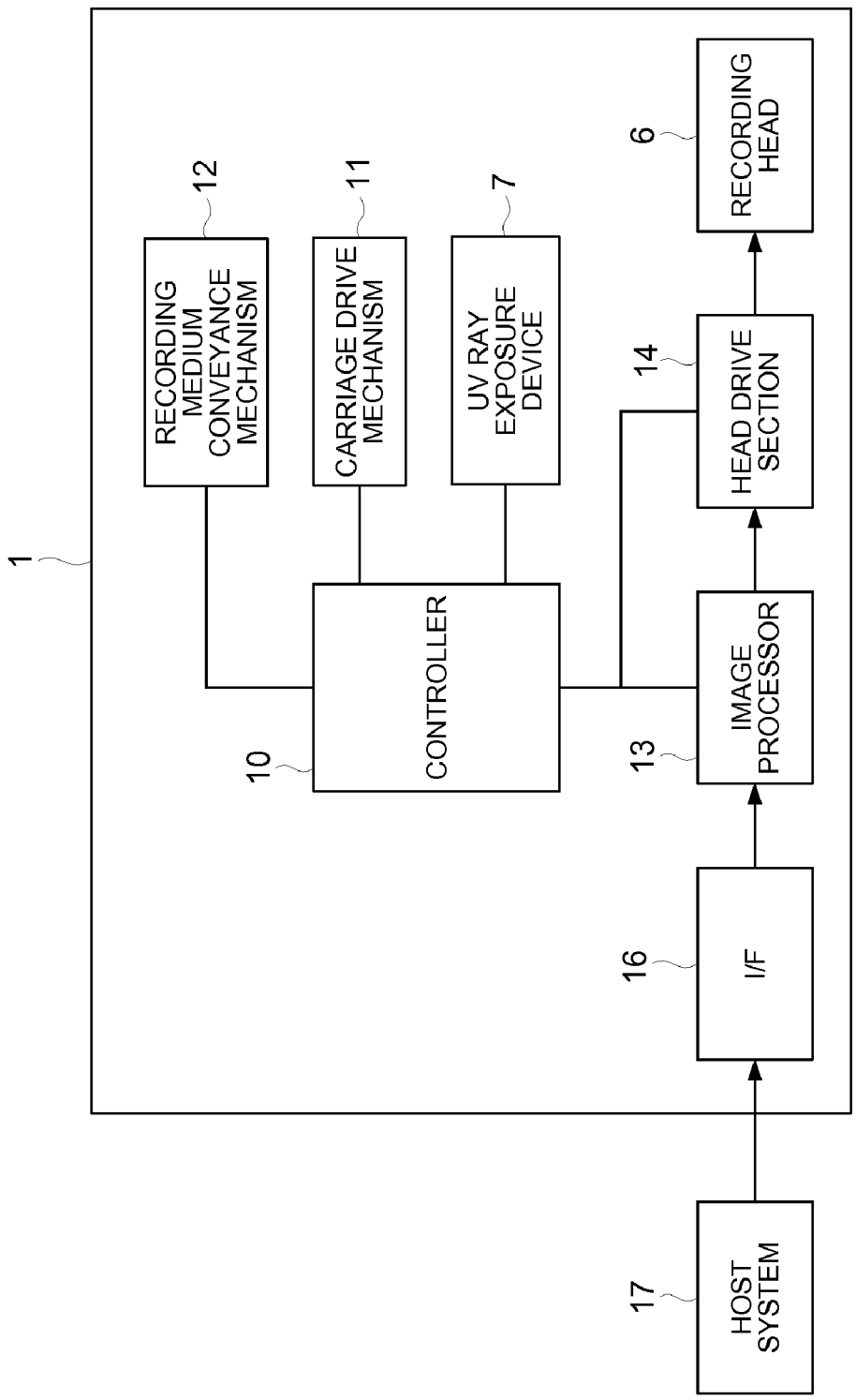
FIG. 3 is a block diagram illustrating main configurations of a controller of an ink-jet recording device of the first embodiment relating to the present invention.

As shown in FIG. 3, ink-jet recording device 1 is provided with controller 10 including such as a CPU (Central Processing Unit), a ROM (Read Only Memory) to store various control program, etc., a RAM (Random Access Memory) to temporarily store image data, etc., (all of these are not illustrated).

Controller 10 develops the control program stored in the ROM on a work area of the RAM, and allows the CPU to execute the program.

To controller 10, connected are image processor 13, head drive section 14 to drive recording head 5, carriage drive mechanism 11, recording medium conveyance mechanism 12, and UV ray exposure device 7.

Image processor 13 decodes the coded input image data sent from host system 17 via interface (I/F) 16 to be record data in a data format processable by ink-jet recording device 1, and sends the record data to head drive section 14. To host system 17, an external device (not illustrated) is connected via a network, and host system 17 and the external device execute inputting for total operation control of ink-jet recording device 1, in addition to sending the image data for recording to ink-jet recording device 1. Further, at host system 17 and the external device, inputting for setting the drive cycle to drive recording head 6 is possible.

Controller 10 allows head drive section 14 to allocate the recording data to each nozzle of recording head 6. Thus, proper amount of ink is ejected from nozzles 61 of recording head 6, and a prescribed image is recorded on recording medium 2.

Controller 10 controls carriage drive mechanism 11 to make carriage 5 execute reciprocating scanning in the horizontal scanning direction X, and controls recording medium conveyance mechanism 12 to convey recording medium 2 in the opposite direction to vertical scanning direction Y in accordance with the movement of carriage 5.

Further controller 10 controls UV ray exposure device 7 to irradiate the UV ray on the ink ejected onto recording medium 2.

In the present embodiment, in order to form one band, the recording of number of scanning times n (n is an even number) is required, and n times of record scanning (scanning with ink ejection to perform recording) is executed. Further, in the present embodiment, the (n+1)th scanning without ink ejection is executed. Namely, for example in the case where 6 times of scanning is required to form the one band, 6 times of record scanning is executed, and after that 7th scanning without ink ejection is executed. In this way, in the present embodiment a main recording of conducting (n+1) times of scanning for forming the one band is executed by nozzles 61 positioned in nozzle region A-G (first group nozzles).

Further, in the (n+2)th scanning a compensating recording to compensate the main recording is executed by nozzles 61 positioned in nozzle region P (second group of nozzles).

For example, the case where an area having 6 pixels×6 pixels is filled (recorded) by 6 times of record scanning (6 path) will be described with reference to FIG. 4.

Figure 4A:
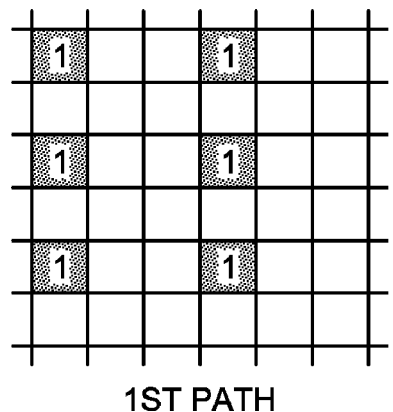
FIGS. 4a-4f are schematic diagrams illustrating the pixels to be recorded by each path in the case of recording the all pixels by 6 times of scanning.
Figure 4B:
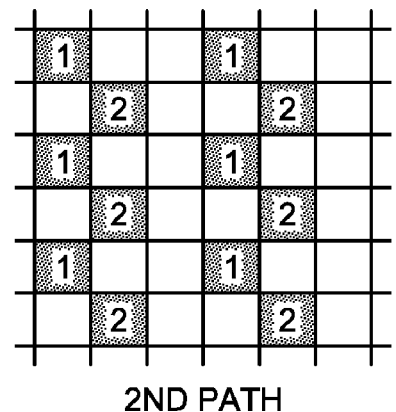
Figure 4C:
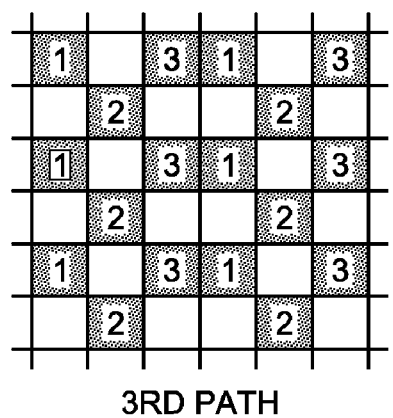
Figure 4D:
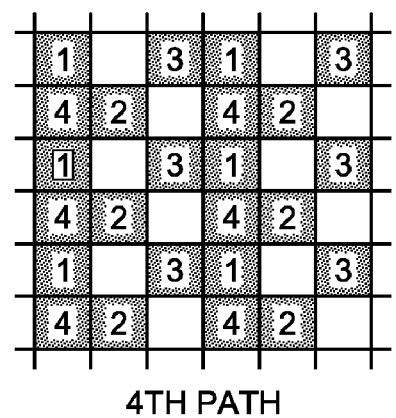
Figure 4E:
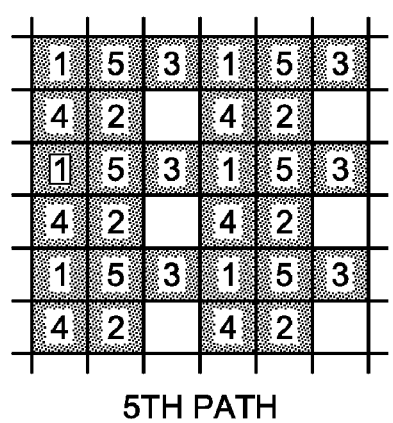
Figure 4F:
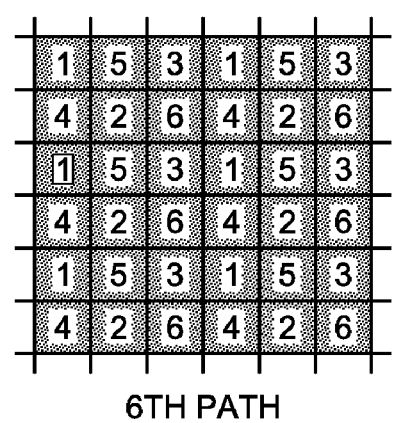

In this case as shown in FIG. 4a, in the first record scanning (1st path), nozzles 61 positioned in nozzle region G, for example, firstly execute the recording at pixels of shaded portions [1]. Next, as shown in FIG. 4b, in the second record scanning (2nd path), nozzles 61 positioned in nozzle region F, for example, execute the recording at pixels of shaded portions [2]. As shown in FIG. 4c, in the third record scanning (3rd path), nozzles 61 positioned in nozzle region E, for example, execute the recording at pixels of shaded portions [3]. Further, as shown in FIG. 4d, in the fourth record scanning (4th path), nozzles 61 positioned in nozzle region D, for example, execute the recording at pixels of shaded portions [4]. Next, as shown in FIG. 4e, in the fifth record scanning (5th path), nozzles 61 positioned in nozzle region C, for example, execute the recording at pixels of shaded portions [5]. Finally, as shown in FIG. 4f, in the sixth record scanning (6th path), nozzles 61 positioned in nozzle region B, for example, execute the recording at pixels of shaded portions [6], and recording of all the pixels in the area are completed.

Further, according to the present embodiment, in the seventh scanning {7th path, (n+1)th scanning}, to be executed subsequently, nozzles 61 positioned in nozzle region A execute the scanning without ejecting the ink. By the above sequences, the main recording for forming the one band by nozzles 61 positioned in nozzle regions A-G (first group of nozzles) is completed.

Thereafter, in the eighth scanning (8th path), which being (n+2)th scanning, nozzles 61 positioned in nozzle region P (second group of nozzles) execute a compensation recording to compensate the main recording.

Incidentally, in FIGS. 4a-4f, for convenience of explanation, the case is shown where all the pixels in said area are filled by the recording from 1st path to 6th path, and in the compensation recording of 8th path, the superposing recording is executed on the pixels already recorded by the 1-6 paths. However, according to the present embodiment, as described later, at the time of recording by nozzles 61 positioned in nozzle region F, which being the second path, the pixels to be recorded (recording pixels) later by the compensation recording are remained without recording, and these pixels (recording pixels) are executed compensation recording by the second group of nozzles of nozzles 61 positioned in the nozzle region P.

In the present embodiment, controller 10 controls recording head 6 and UV ray exposure device 7 so that the recording operation is conducted in both the outward scanning and the homeward scanning of the movement in the horizontal scanning direction. Further in the recording operation of at least one of the outward scanning and the homeward scanning, the ink ejection from nozzles 61 is controlled such that the recording data is not allocated onto nozzles 61 positioned in a prescribed nozzle region at the end portion of recording head 6 in order not to use said nozzles 61.

Figure 5:
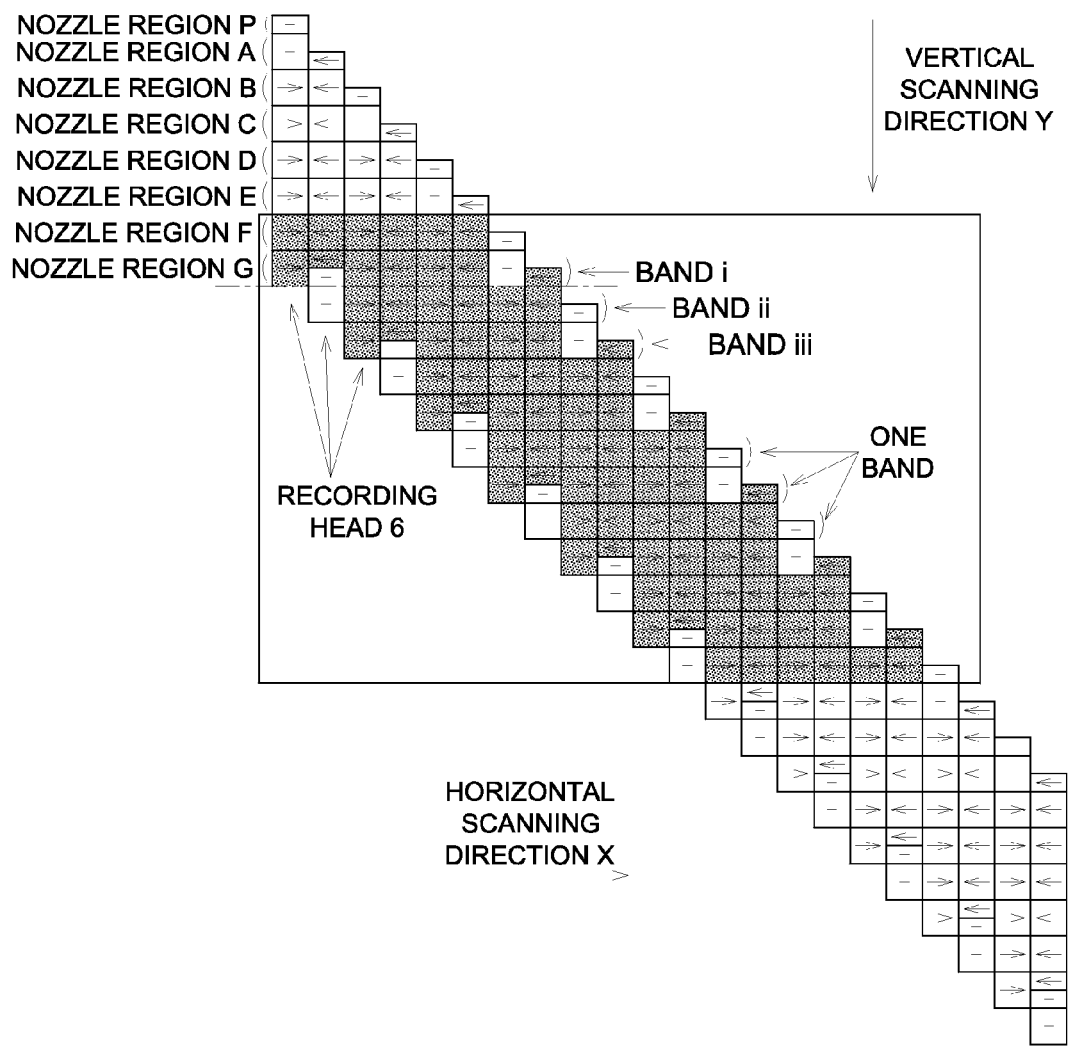
FIG. 5 is a schematic diagram illustrating a corresponding nozzle region of the recording head for recording each band in the first embodiment.

Here, by referring to FIG. 5, the ink ejection control by controller 10 will be specifically described.

In FIG. 5, each portion divided by the vertical lines indicates recording head 6 shown in FIG. 2. Illustration of recording head 6 by obliquely shifting from left-hand side to right-hand side schematically shows the relative positional relation of recording head 6 to recording medium 2 for each scanning, in a case where recording is executed by conveying recording medium 2 in the opposite direction to the vertical scanning direction Y by each scanning.

In ink-jet recording device 1 of the present embodiment, as shown in FIG. 5, when amount of movement (conveying width) M of recording medium 2 conveyed by one time of conveyance with the vertical scanning device of recording medium conveyance mechanism 12 is assumed to be one band, the required number of scanning times n to fill the pixels recording pixels) constituting the one band is 6.

As described below, controller 10 does not allocate the recording data to certain nozzles 61. This causes to execute the recording (main recording) without utilizing the certain nozzles 61 in the recording operation, and controller 10 controls carriage drive mechanism 11, recording medium conveyance mechanism 12 and each recording head 6 such that recording head 6 scans (6+1:n+1=7) times in the horizontal scanning direction X to form the one band. Further, when recording head 6 executes (6+2)th or {(n+1)+1}th scanning (namely 8th scanning), controller allocates the recording data to certain nozzles such that the compensation recording for compensating the main recording is executed by utilizing nozzles 61 in nozzle region P positioned at the end portion of recording head 6. Controller 10 is possible not to allocate the recording data to only a part of certain nozzle region. This causes not to preliminarily execute the recording on a position for compensation recording by the 8th scanning.

In FIG. 5, parts divided by the solid lines show nozzles regions A-G and nozzle region P. Among these, the nozzle region including the first group of nozzles 61 to execute the main recording is divided into 7 nozzle regions A-G, corresponding to the number of scanning times (6+1=7) for forming the one band.

Each of nozzle regions A-G has a region corresponding to the length equivalent to the amount of movement M (amount of conveyance) for each horizontal scanning of recording medium 2 by recording medium conveyance mechanism 12 of the vertical scanning device. Length of the nozzle row α in nozzle region P is set to be less than the amount of movement M (amount of conveyance) for each horizontal scanning of recording medium 2. The length of the nozzle row a in nozzle region P may only be less than the amount of movement M, and is not particularly restricted, however, in the present embodiment the case is illustrated where α is approximately a half of the amount of movement M.

In FIG. 5, allow marks shown in regions divided by solid lines shows whether the recording in each nozzle region is executed in outward or homeward, namely the scanning direction (moving direction) of recording head 6. The region where a short bar (−) is put (where the allow mark is not put) is a region for not being used in the recording operation, and controller 10 controls the ink ejection from recording head 6 not to eject the ink from said nozzle 61 by not allocating the recording data to the nozzles positioned in the region of not using for the recording operation.

In an actual recording operation, recording head 6 is fixed at a certain position in vertical scanning direction Y, and recording medium 2 moves in the opposite direction to the vertical scanning direction Y, however in FIG. 5, for convenience of explanation, illustrated is such that the position of recording medium 2 is fixed and the relative position of recording head 6 to recording medium 2 is sequentially moved from upstream to down stream in the vertical scanning direction Y.

In the present embodiment, controller 10 in the outward scanning, among nozzle regions A-G and nozzle region P of recording head 6, sets the nozzle region P positioned at the most upstream side in the vertical scanning direction Y (upside in FIG. 5) and the nozzle region A adjoining to the nozzle region P as the region for not using in the recording operation, and controller 10 does not allocate the recording data to nozzles 61 positioned in said nozzle region P and nozzle region A, and controls the ink ejection from recording head 6 so that said nozzles 61 do not eject the ink.

In the homeward scanning, among nozzle regions A-G and nozzle region P of recording head 6, controller 10 sets the nozzle region G positioned at the most downstream side in the vertical scanning direction Y (downside in FIG. 5) and a part in downstream side in the vertical scanning direction Y of the nozzle region F adjoining to the nozzle region G as the region for not using in the recording operation, and controller 10 does not allocate the recording data to nozzles 61 positioned in said nozzle region G and a part of nozzle region F, and controls the ink ejection from recording head 6 such that said nozzles 61 do not eject the ink. Wherein, the length in the vertical scanning direction Y of the part the nozzle region F not being allocated the recording data coincides with the length a of nozzle region P containing the second group of nozzles 61 for executing the compensation recording.

In this way, in the present embodiment, controller 10 does not allocate the recording data to the nozzles positioned at different end portions of recording head 6 (nozzles 61 positioned in nozzles region A and nozzle region P, or nozzles 61 positioned in nozzles region G and a part of nozzle region P) by the record operation of outward scanning and the record operation of homeward scanning, and controls the ink ejection from recording head 6 so that said nozzles 61 do not eject the ink.

Specifically, with respect to band i in FIG. 5, the writing start portion of the band i is recorded by the recording operation by the outward scanning of nozzle region G (right-pointing allow in FIG. 5). After that, by conveying recording medium 2 in the opposite direction to the vertical scanning direction Y, the recording operation is executed by the homeward scanning (left-pointing allow in FIG. 5) of nozzle region F. In this case, controller 10 does not allocate the recording data to nozzles 61 positioned approximately in a half of the nozzle region F in the adjoining side to the region G, not to execute recording at the position corresponding to the reason.

In accordance with the sequential conveyance of recording medium 2 in the opposite direction to the vertical scanning direction, the nozzle regions A-G to execute the recording of band i shift. And the recording on band i is executed by 6 times of scanning in sequence of: the recording operation by the outward scanning (right-pointing allow in FIG. 5) of nozzle region E, the recording operation by the homeward scanning (left-pointing allow in FIG. 5) of nozzle region D, . . . . After that, in the seventh scanning of outward scanning (right-pointing allow in FIG. 5) by nozzle region A for band i, controller 10 controls not to eject ink form nozzles 61 positioned in nozzle region A. In this way, the recording of band i starts by the outward scanning, and the outward scanning and the homeward scanning are alternately repeated until 7th scanning (6 times record scanning, and one scanning without ink ejection). In the present embodiment, 7 times scanning by nozzles 61 positioned in nozzle regions A-G (first group of nozzles) are referred to the main recording for forming one band.

After that, at the time of next 8th scanning, namely {(n+1)+1}th scanning, controller 10 allocates the recording data to nozzles 61 positioned in nozzle region P (second group of nozzles), to execute the recording on the portion not recorded in the previous main recording for forming the band i (unrecorded recording pixels in a part of nozzle region F). Due to this, the boundary of the region recorded by said horizontal scanning (the upstream side boundary in the vertical scanning direction Y of the region recorded by nozzle region P) comes to more upstream side in the vertical scanning direction Y than a boundary between band i formed by the horizontal scanning from 1st to (n+1)th scanning and the next band ii (boundary shown by a dashed-dotted line in FIG. 5). Namely the upstream side boundary in the vertical scanning direction Y of the region recorded by nozzle region P is formed within the width of band i formed by the horizontal scanning from 1st to (n+1)th scanning.

Since there is a time interval between the first scanning for band i and the first scanning for band ii next to band i, in case of simply executing the recording, so-called a joint line is generated in the border between band i and band ii (border shown by a dashed dotted line in FIG. 5) due to hardening time of the ink and the like. However, according to the present embodiment, by executing the compensation recording with nozzles 61 in nozzle region P (second group of nozzles) to cover the boundary between band and band ii, the joint line can be made inconspicuous.

With respect to band ii, in the recording operation of the first scanning for band ii by the homeward scanning (left-pointing allow in FIG. 5) of nozzle region G, controller 10 controls not to eject ink from nozzles 61 positioned in nozzle region G. Due to this, the writing start portion of the band ii is recorded by the recording operation by the outward scanning of nozzle region F (right-pointing allow in FIG. 5). In accordance with the sequential conveyance of recording medium 2 in the opposite direction to the vertical scanning direction, the nozzle regions A-G to execute the recording of band ii shift. And the recording on band ii is executed by 6 times of scanning (7 times of scanning, record scanning counting from the 1st scanning for band ii) in sequence of: the recording operation by the homeward scanning (left-pointing allow in FIG. 5) of nozzle region E, the recording operation by the outward scanning (right-pointing allow in FIG. 5) of nozzle region D, the recording operation by the homeward scanning (left-pointing allow in FIG. 5) of nozzle region C, . . . . In this way, same as the recording of band i, the recording of band ii starts by the outward scanning, and the outward scanning and the homeward scanning are alternately repeated until 7th scanning (6 times record scanning, and one scanning without ink ejection). The 7 times scanning by nozzles 61 positioned in nozzle regions A-G (first group of nozzles) are the main recording for forming the one band.

After that, at the time of 8th scanning counted from the first scanning for band ii, controller 10 controls not to eject ink from nozzles 61 positioned in nozzle region P (the second group of nozzles). Meanwhile, different from the above-described case of band i and band ii, since there is no time interval between the first scanning for band ii and the first scanning of band iii (the recordings are concurrently started), the joint line will not be conspicuous even without such compensation recording covering the border of band i and band ii.

Figure 6:
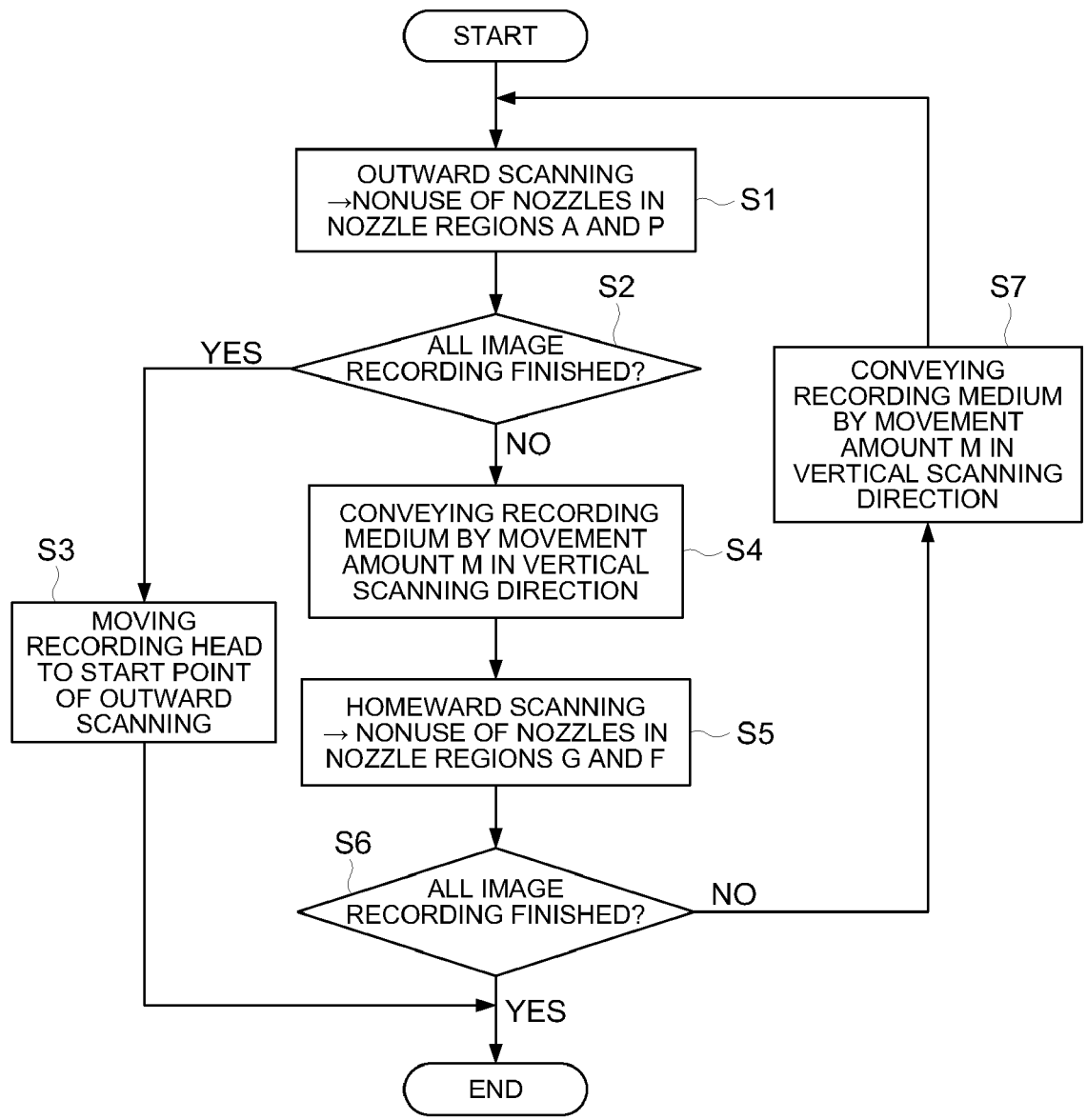
FIG. 6 is a flow chart illustrating the ink-jet recording method of the first embodiment.

Next, the ink-jet recording method of the present embodiment will be described referring to FIG. 6.

Meanwhile, the description of "conveying recording medium by movement amount M in vertical scanning direction" means to convey recording medium 2 in the relative vertical scanning direction of recording medium 2 relative to recording head 6 (the opposite direction to the relative vertical scanning direction Y of recording head 6 relative to recording medium 2) by the amount of movement M.

When the image data is sent to ink-jet recording device 1 from host system 17 or an external apparatus (not illustrated) via interface I/F 16, the sent image data is processed with prescribed processing such as decoding processing by image processor 13, and is stored in the un-illustrated storage section provided in image processor. Then, when all the data required for image recording become available, controller 10 controls each part of the apparatus to shift to the recording operation. Namely, controller 10 controls recording medium conveyance mechanism 12 to sequentially convey the recording medium 2 from upstream side to downstream side, in the opposite direction to the vertical scanning direction. Further, controller 10 controls carriage drive mechanism 11 such that recording head 6 installed on carriage 5 scans along the horizontal scanning direction X above recording medium 2, and controller 10 controls head drive section 13 to operate recording head 6 such that prescribed amounts of ink are ejected on prescribed pixels in outward and homeward scanning in the horizontal scanning direction X. Further, controller 10 controls UV ray exposure device 7 to irradiate the UV ray onto the ink ejected on recording medium 2.

Specifically, controller 10 causes recording head 6 to firstly scan in the horizontal scanning direction from left side to right side (outward scanning in the outward path: step S1). In this outward scanning in the outward path, in order not to cause nozzles 61 positioned in nozzle region A and nozzle region P to eject the ink, controller 10 controls not to allocate the recording data to said nozzles 61.

When the scanning is completed, controller 10 determines whether the recording operation required for recording all the image is completed (step S2), and in the case where the recording operation is completed (step 2; YES), controller 10 controls carriage drive mechanism 11 such that recording head 6 installed on the carriage 5 moves to the starting point of the outward scanning (the far left of the movable range of carriage 5, in the ink-jet recording device of the present embodiment) (step 3), and the process is finished.

On the other hand, in the case where the recording operation is not completed (step S2; NO), controller 10 conveys recording medium 2 from the upstream to down stream in the opposite direction to the vertical scanning direction Y by the amount of movement M (step 4).

Subsequently, controller 10 causes recording head 6 to scan from right side to left side in the horizontal scanning direction X (homeward scanning in the homeward path, step S5). In this homeward scanning in the homeward path, in order not to cause nozzles 61 positioned in nozzle region C and a part adjoining to the nozzle region G in nozzle region F to eject the ink, controller 10 does not allocate the recording data to said nozzles 61. Then, by irradiating the UV ray onto the ink ejected on recording medium 2, the ink is hardened and fixed, thus an image is recorded on recording medium 2.

Controller 10 determines at all times whether the recording operation required for recording the all image is completed, and if not (step S6; NO), controller 10 moves recording medium 2 from the upstream to down stream in the opposite direction to the vertical scanning direction Y by the amount of movement M (step S7), and return to step S1 to alternately repeat the outward scanning and the homeward scanning.

Due to the above, when focusing on one band, recording for all pixels in said one band is completed by 6 times (n times) scanning for one band, and by executing the scanning without ejecting the ink at 7th scanning {(n+1)th scanning)}, the 7 times (n+1 times) scanning complete the horizontal scanning for forming a band with respect to said one band by nozzles 61 positioned in nozzle regions A-G (the first group of nozzles). Further, in the 8th scanning (record scanning) which is the (n+2)th scanning, compensation recording for compensating the horizontal scanning is executed by nozzles 61 positioned in nozzle region P (the second group of nozzles).

On the other hand, in the case where the recording operation required for recording the all image is completed, (step S6; YES), controller 10 terminates the operation.

As described above, according to the present embodiment, in the $\{(n+1)+1\}$th horizontal scanning, the second group of nozzles 61 execute the recording on the recording pixels of the region having a length (the length of nozzle row a of the second of nozzles 61) smaller in the vertical scanning direction Y than the conveying amount (amount of movement M) of recording medium by recording medium conveyance mechanism 12, so that the upstream side boundary in the vertical scanning direction Y of the region recorded by said horizontal scanning is formed within the band width formed by first to (n+1)th scanning. Due to this, the joint line generated by the time difference between the time of starting or finishing of the recording for a certain band and the time of starting or finishing of the recording for an adjoining band to the certain band becomes inconspicuous.

Further, regarding the conveyance of recording medium 12, it is only required to convey the recording medium with a predetermined constant amount of conveyance (the amount of movement M), therefore the structure and control of the apparatus can be simple.

Further, by executing the recording according to the present embodiment, the portion of start writing begins with outward scanning for every band, the recording is executed by sequentially repeating the outward scanning and the homeward scanning, and a band is formed by the (n+1) times of scanning which being required for forming one band. Therefore, for the formation of the all band, the order of the outward scanning or the forward scanning for recording a certain number of scanning is the same (the combination of the scanning direction in the recording operation of each band is the same).

Therefore, in cases where both the outward and homeward recording are executed and even the cases where one band is formed by the multiple times (even numbered) of scanning, generation of uneven image of banding, which is caused by the difference such as ink ejection order, time for drying, timing of irradiating the activation energy ray by each band, can be prevented and a high quality image can be formed.

In the present embodiment, although the case is exemplified where one band is formed with 6 times of scanning (record scanning), the required scanning times to form the one band is not restricted to this. For example, the one band may be formed by the scanning of smaller number of times such as 4 times, or by the scanning of greater number of times.

Even in those cases, the main recording is executed with (n+1) times where n is the number of scanning times required for forming one band (number of record scanning times), and at the $\{(n+1)+1\}$th scanning, the compensation scanning to compensate the horizontal scanning is executed. Then, the nozzle region of the nozzle head is divided to the regions of number of scanning times: (n+1)+1, and among the divided regions, the nozzles (the second group of nozzles) positioned in the nozzle region of upstream end portion (a portion) in the vertical scanning direction Y and the nozzle region adjoining to this region, and the nozzle region positioned in the downstream end portion in the vertical scanning direction Y and a part of the nozzle region adjoining to this region are set to be regions which are alternately not used for the recording operation in the outward scanning and the homeward scanning.

In the present embodiment, nozzle region P positioned in the most upstream side in the vertical scanning direction of the nozzle regions A-G of recording head 6, and nozzle region A adjoining to nozzle region P are set to be nonuse region for the recording operation in the outward scanning; and nozzle region G positioned in the most downstream side in the vertical scanning direction of the nozzle regions A-G of recording head 6, and a part of nozzle region F adjoining to nozzle region G are set to be nonuse region for the recording operation in the homeward scanning. However, the case is also possible, for example, where nozzle region G and a part of nozzle region F adjoining to nozzle region G are set to be nonuse region for the recording operation in the outward scanning, and nozzle region P and nozzle region A adjoining to nozzle region P are set to be nonuse region for the recording operation in the homeward scanning.

In the present embodiment, in the case where the number of scanning times for forming one band is n, (n+1) times of scanning is carried out, and at the time of $\{(n+1)+1\}$th scanning, the recording (compensation recording) by the second group of nozzles are executed, however, the timing of the recording (compensation recording) is not limited to that exemplified here. For example, the recording by the second group of nozzles 61 may be executed at the time of horizontal scanning of $\{(n+1)+2\}$th or later. Further, the case is possible where n times of scanning is carried out for forming one band, and the scanning by the second group of nozzles 61 is carried out at the time of horizontal scanning of (n+1)th or later.

Further, in the present embodiment, to the area remained without being recorded by preventing the ink ejection from nozzle 61 positioned in a part of nozzle region F in the homeward scanning, the recording is carried out by ejecting ink from nozzle 61 positioned in nozzle region P in the $\{(n+1)+1\}$th scanning. However the case is possible where in the homeward scanning ink ejection from all the nozzle region F is carried out, and the ink ejected from nozzle 61 positioned in nozzle region P in the $\{(n+1)+1\}$-th scanning is superposed on the ink ejected from nozzle region F. Even in this case, the upstream side boundary in the vertical scanning direction Y of the region recorded by nozzles 61 positioned in nozzle region P comes to more upstream side in the vertical scanning direction Y than a boundary between band i and the next band ii, and the boundary is formed within the width of band i, thus the joint line appearing in the boundary of band i and band ii becomes inconspicuous.

Further, in the present embodiment, the case is exemplified where the position of recording head 6 is fixed in the vertical scanning direction, and recording medium 2 moves (is conveyed) by a predetermined amount of movement M in the opposite direction to the vertical scanning direction Y, however, the ink-jet recording device is not limited to this, only required is to make at least one of the recording medium and the recording head relatively scan in the vertical scanning direction Y by a predetermined amount of movement M. For example, in the condition of making the recording medium 2 stay still, the recording head 6 may be moved from upstream to downstream in the vertical scanning direction by the predetermined amount.

Further, in the present embodiment, the case of bidirectional recording system is exemplified where recording operation is carried out both in outward and homeward scanning, however, the ink-jet recording device is not limited to this, but may be one-way recording system where recording is carried out in any one of outward scanning or homeward scanning. In this case the controller controls not to allocate the recording data to nozzles 61 positioned in different end portions of the recording head 6 (nozzles 61 positioned in nozzle regions A and P, or nozzles positioned in nozzle region G and a part of nozzle region F), and not to use these nozzles 61 for ejecting ink.

Figure 7:
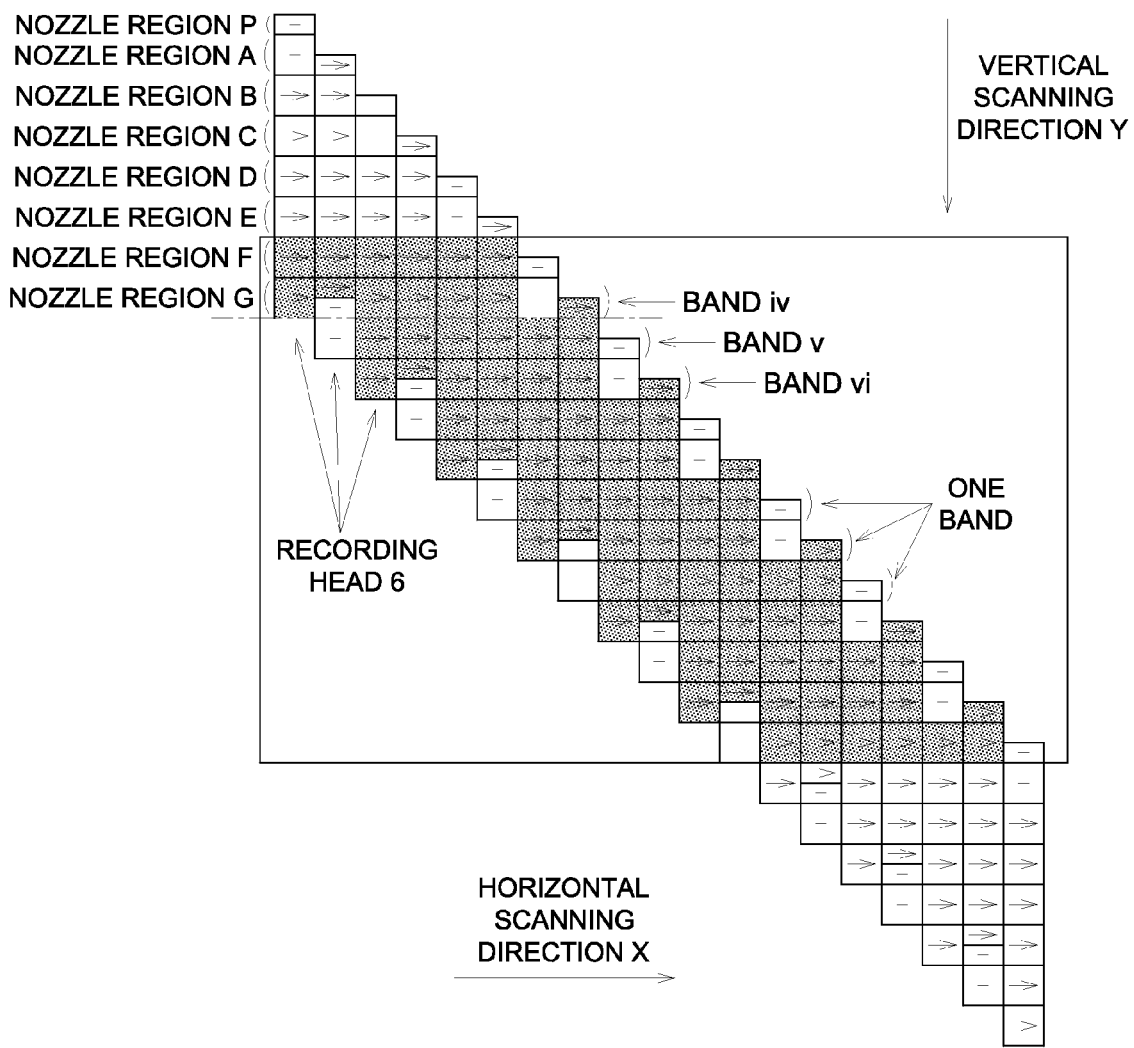
FIG. 7 is a schematic diagram illustrating the corresponding nozzle region of the recording head for recording each band in a modified version of the first embodiment.

Here, by referring to FIG. 7, the recording method in the case of one-way recording system will be described regarding the points different from the bidirectional recording system.

In the one-way recording system, the controller controls not to allocate the recording data to the nozzles 61 positioned in nozzle region A and in nozzle region P in order not to eject ink from these nozzles, and makes the recording head 6 scan (recording scan) from left side to right side in the horizontal scanning direction X (the first scanning). Next, the controller causes recording medium 2 moves from the upstream side to the down stream side in the opposite direction to the vertical scanning direction by the amount of movement M, and causes recording head 6 to move from right hand to left hand in the horizontal scanning direction to return to the original position.

Subsequently, the controller makes the recording head 6 scan (recording scan) from left side to right side in the horizontal scanning direction X (the second scanning). In this second scanning, the controller controls not to allocate the recording data to nozzles 61 positioned in nozzle region C and a part of nozzle region F in the side adjoining to the nozzle region G, in order not to eject the ink from these nozzles 61. The controller repeats these operations until completion of the recording operation necessary for recording the all image. By this, in the portion (pixel) remained without being recorded where the ink is not ejected from nozzles 61 positioned in a part of nozzle region F in the second horizontal scanning and fourth horizontal scanning . . . , the ink ejection for recording from nozzles 61 positioned in nozzle region P can be carried out in the {(n+1)+1}th scanning.

Namely, when focusing on one band, with 6 times (n times) scanning (record scanning) for one band, the recording for all pixels in said band is completed, and by the 7th {(n+1)th} scanning the main recording for forming the one band by nozzles 61 positioned in nozzle regions A-G (the first group of nozzles) is completed. Further, in the 8th (n+2) scanning (record scanning), the compensation recording for compensating the main recording is carried out by nozzles 61 positioned in nozzle region P.

Thus, the upstream side boundary in the vertical scanning direction Y of the region recorded by nozzles 61 positioned in nozzle region P comes to more upstream side in the vertical scanning direction Y than a boundary between band iv and the next band v, and the boundary is formed within the width of band iv.

Also in such one-way recording system, the case is possible where all nozzles in nozzle region F eject the ink in the second horizontal scanning and fourth horizontal scanning . . . , and the ink ejected for recording from the second group of nozzles 61 positioned in nozzle region P is superposed on the ink having been ejected from nozzle region F.

Further, similarly to the case of the bidirectional recording system, the timing for second group of nozzles 61 positioned in nozzle region P to carry out the recording is not limited.

Further, in the present embodiment the image recording is carried out by utilizing the curable ink which is hardened by irradiating the UV ray, however the ink is not necessarily limited to this type, and the ink hardened by the activation energy ray other than the UV ray such as electron beam, X ray, visible ray, infrared ray may be usable. In this case the ink utilizes a polymerizable compound which is polymerized and hardened by the activation energy ray other than the UV ray, and a photo initiator which initiates a polymerization reaction between polymerizable compounds with the irradiation of the activation energy ray other than the W. In the case of utilizing the photo hardening ink hardened by the activation energy ray other than the UV ray, the ray source for irradiating the activation energy ray other than the UV ray is utilized instead of the UV ray source.

Further, the ink which is hardened without irradiating the activation energy ray may be used. In this case, the ray source for the activation energy ray is not required.

Recording head 6 to be used in the ink-jet recording device 1 of the present invention may be an on-demand type or continuous type. Regarding the ink ejection type, any of the types of electro-mechanical transduction type (such as a single-cavity type, double-cavity type, a bender type, a piston type, a shear mode type, a sheared wall type), electro-thermal inkjet type, such as Bubble Jet (Registered trade mark) type, electrostatic suction type (such as a spark-jet type) may be utilized.

Other than the above, the present invention can be arbitrarily changeable not by limited to the above described embodiment.

Next, by referring to FIGS. 8 and 9, the second embodiment of the ink-jet recording device relating to the present invention will be described. Since the second embodiment is different from the first embodiment only in the number of scanning times required to form the one band, the points different from the first embodiment will be described below in particular.

The ink-jet recording device of the present embodiment is provided with a recording head 8 (refer to FIG. 8) installed on a non-illustrated carriage. The ink-jet recording device is provide with a carriage drive mechanism (not illustrated) as a horizontal scanning device and a recording medium conveyance mechanism (not illustrated) as a vertical scanning device, and moves the recording medium (not illustrated) by the recording medium conveyance mechanism in the opposite direction to the vertical scanning direction Y, in addition to move the recording head installed on the carriage by the carriage drive mechanism in the horizontal scanning direction X, and sequentially carries out the recording operation. Onto the ink ejected from recording head 8 a UV ray as the activation energy ray is irradiated from a UV ray exposure device (not illustrated).

In the present embodiment, the ink-jet recording device requires the recording of n times of scanning (n is an odd number), and executes n times of record scanning (the scanning for recording accompanied with ink ejection). Further, in the present embodiment the (n+1)th scanning is carried out without ink ejection. Namely for example, in the case where 5 times scanning is required to form one band, 5 times scanning is carried out for the one band, and after that the 6th scanning without ink ejection is executed. In this way, in the present embodiment, the main recording to execute n+1 times scanning for forming the one band is carried out with nozzles 81 (the first group of nozzles) positioned in nozzle regions A-G.

Further, in (n+2)th scanning, the compensation recording to compensate the horizontal scanning is executed by nozzles 81 (the second group of nozzles) positioned in nozzle group P.

Hereinafter, regarding the present embodiment, the case is exemplified for explanation where the required number of scanning times for forming the one band is five as described below.

Figure 8:
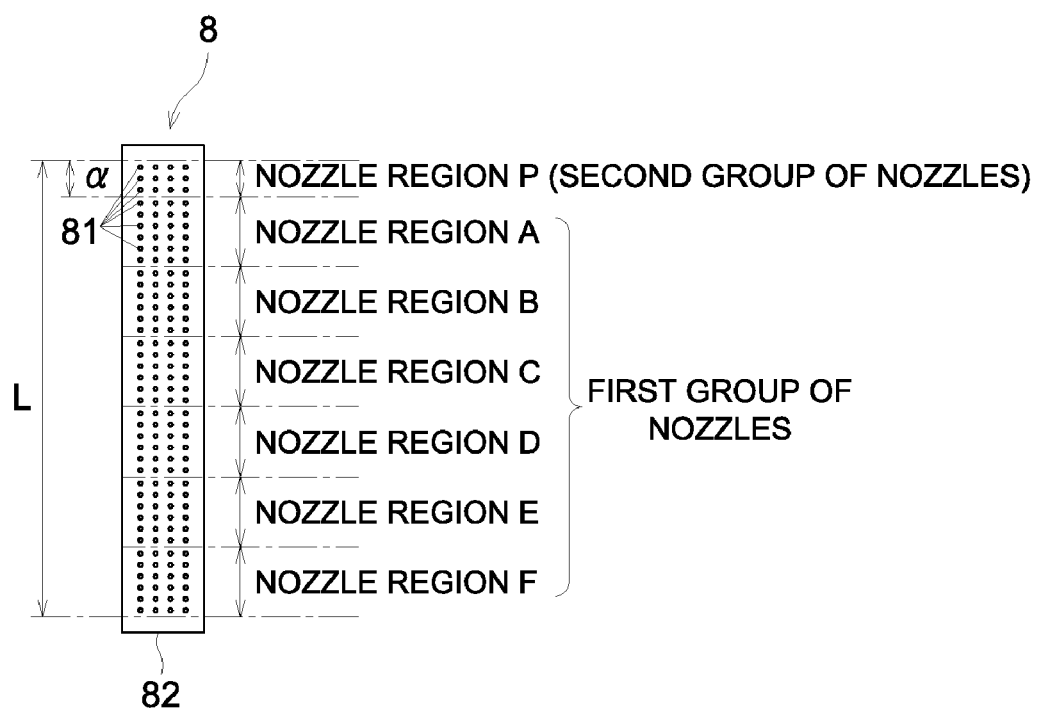
FIG. 8 is a drawing illustrating each nozzle region of a recording head of an ink-jet recording device in the second embodiment.

The face of said recording head 8 opposing to the recording medium is, for example as shown in FIG. 8, ink ejection surface 82 where a plurality of nozzles 81 are arranged in row along the longitudinal direction of recording head 8 (the vertical scanning direction Y). Each recording head 8 ejects the ink form respective nozzles 81.

The region (nozzle region) arranged in nozzle 81 is, for example as shown in FIG. 8, divided to 6 regions which is greater by 1 than the number of scanning times n required for recording the one band. In the recording head 8, each nozzle 81 is allocated with recording data (drive signals corresponding to the recording data) by the controller (not illustrated), thus an ink ejection control, such as preventing the ink ejection from the nozzles in a certain region, is executed.

Similarly to the first embodiment, the ink-jet recording device is provided with a controller (not illustrated).

Further, in the present embodiment, the controller controls recording head 8 and UV ray exposure device in both directions of the outward scanning in outward path and the homeward scanning in homeward path in the horizontal scanning direction X by a carriage drive mechanism. Further in the recording operation of one of the outward scanning and the homeward scanning, the controller controls the ink ejection from the nozzles 81 such that the recording data is not allocated onto nozzles 8 positioned in a prescribed nozzle region at the end portion of recording head 8 in order not to use said nozzles 81.

Figure 9:
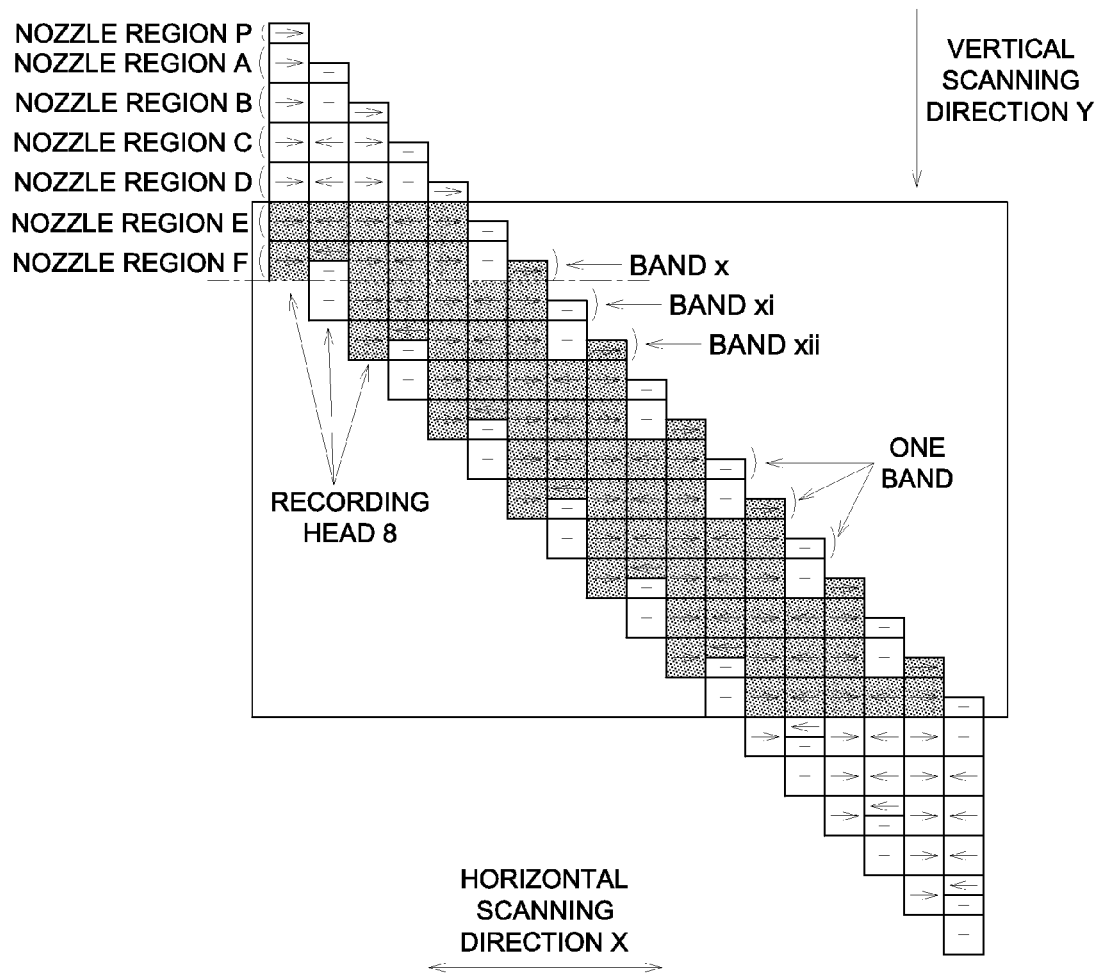
FIG. 9 is a schematic diagram illustrating the corresponding nozzle regions of the recording head for recording each band in the second embodiment.

Here, by referring to FIG. 9, the ink ejection control by the controller will be specifically described.

FIG. 9 is a schematic diagram, expressing for convenience sake in explanation, such that the position of the recording medium is fixed and the relative position of recording head 8 relative to the recording medium moves from the upstream side to the down stream side of the vertical scanning direction Y, similarly to the case described in FIG. 5. In FIG. 9, each portion divided by the vertical lines indicates recording head 8 shown in FIG. 8. Illustration of recording head 8 by obliquely shifting from left-hand side to right-hand side schematically shows the relative positional relation of recording head 8 to the recording medium for each scanning, in a case where recording is executed by conveying the recording medium in the opposite direction to the vertical scanning direction Y by each scanning.

In ink-jet recording device of the present embodiment, as shown in FIG. 9, when the amount of movement (conveying width) of the recording medium conveyed by one time of conveyance with the vertical scanning device of a recording medium conveyance mechanism is assumed to be one band, the required number of scanning times n (the number of record scanning times) to form the one band is 5. The controller controls the carriage drive mechanism, the recording medium conveyance mechanism and each recording head 8 such that recording head 8 scans 6 times (=record scanning 5 times+1 time of scanning without accompanying the ink ejection) in the horizontal scanning direction X to form the one band.

In FIG. 9, parts divided by the solid lines show nozzles regions A-F and nozzle region P. Among these, the nozzle regions A-F is the regions where the first group of nozzles 81 to execute the main recording is provided, and the nozzle regions P is the region where the second group of nozzles 81 to execute the compensation recording to compensate the main recording is provided. In this way, the region where the first group of nozzles 81 to execute the main recording is divide into 6 nozzle regions (nozzle regions A-F) corresponding to the number of scanning times (6 times) for forming the one band.

In FIG. 9, allow marks shown in regions divided by solid lines shows whether the recording in each nozzle region is executed in outward or homeward, namely the scanning direction (moving direction) of recording head 8. The region where a short bar (−) is put (where the allow mark is not put) is a region for not being used in the recording operation, and the controller controls the ink ejection from recording head 8 not to eject the ink from said nozzle 81 by not allocating the recording data to the nozzles positioned in the region of not using for the recording operation.

In the present embodiment, the controller in the outward scanning, among nozzle regions A-F and nozzle region P of recording head 8, sets the nozzle region P positioned at the most upstream side in the vertical scanning direction Y (upside in FIG. 9), the nozzle region A, the nozzle region F positioned at the most downstream side in the vertical scanning direction Y (downside in FIG. 9), and a part in downstream side in the vertical scanning direction Y of the nozzle region E adjoining to the nozzle region F as the region for not using in the recording operation. And the controller does not allocate the recording data to nozzles 81 positioned in said nozzle region P and nozzle region A, nozzle region F and the part in downstream side in the vertical scanning direction Y of the nozzle region E, and controls the ink ejection from recording head 6 such that said nozzles 61 do not eject the ink. Meanwhile, in the homeward scanning, all the nozzle regions A-F and nozzle region P of recording head 8 are utilized for the recording operation, and the ink is ejected from all nozzles 81. In this way, in the present embodiment, the controller does not allocate the recording data, in the recording operation of homeward scanning, to the nozzles positioned at end portions of recording head 8 (nozzles 81 positioned in nozzles region A and nozzle region P, and nozzles 81 positioned in nozzles region F and the part in downstream side in the vertical scanning direction Y of the nozzle region E), and controls not to use said nozzles 81 for ink ejection.

Specifically, with respect to band x in FIG. 9, the writing start portion of the band x is recorded by the recording operation by the outward scanning of nozzle region F (right-pointing allow in FIG. 9). After that, by conveying the recording medium in the opposite direction to the vertical scanning direction Y, the recording operation is executed by the homeward scanning (left-pointing allow in FIG. 5) of nozzle region E. In this case, the controller does not allocate the recording data to nozzles 81 positioned approximately in a half of the nozzle region E in the adjoining side to the region F, not to execute recording at the position corresponding to the reason.

In accordance with the sequential conveyance of the recording medium in the opposite direction to the vertical scanning direction, the nozzle regions A-F shift to execute the recording of band x. And the recording on band x is executed by 5 times of scanning in sequence of: the recording operation by the outward scanning (right-pointing allow in FIG. 9) of nozzle region D, the recording operation by the homeward scanning (left-pointing allow in FIG. 9) of nozzle region C, . . .

After that, in the sixth scanning of outward scanning (right-pointing allow in FIG. 9) by nozzle region A for band x, the controller controls not to allocate the recording data to nozzles 81 positioned in nozzle region A in order not to eject ink from said nozzles. In this way, the recording of band x starts with the writing start portion by the outward scanning, and the outward scanning and the homeward scanning are alternately repeated until 6th scanning (5 times record scanning, and one scanning without ink ejection).

After that, at the time of next 7th scanning, namely {(n+1)+1}th horizontal scanning, the controller allocates the recording data to nozzles 81 positioned in nozzle region P (second group of nozzles), to execute the recording on the portion not recorded in the previous main recording for forming the band x (unrecorded recording pixels in a part of nozzle region E). Due to this, the boundary of the region recorded by said horizontal scanning (the upstream side boundary in the vertical scanning direction Y of the region recorded by nozzle region P) comes to more upstream side in the vertical scanning direction Y than a boundary between band x formed by the horizontal scanning from 1st to (n+1)th scanning and the next band xi (boundary shown by a dashed-dotted line in FIG. 9). Namely the upstream side boundary in the vertical scanning direction Y of the region recorded by nozzle region P is formed within the width of band x formed by the horizontal scanning from 1st to (n+1)–th scanning.

Since there is a time interval between the first scanning for band x and the first scanning for band xi next to band x, in case of simply executing the recording, so-called a joint line is generated in the border between band x and band xi (border shown by a dashed dotted line in FIG. 9) due to hardening time of the ink and the like. However, according to the present embodiment, by executing the compensation recording with nozzles 81 in nozzle region P (second group of nozzles) to cover the boundary between band x and band xi, due to this the joint line can be made inconspicuous.

With respect to band xi, in the recording operation of the first scanning for band xi by the homeward scanning (left-pointing allow in FIG. 9) of nozzle region F, the controller controls not to eject ink from nozzles 81 positioned in nozzle region F. Due to this, the writing start portion of the band xi is recorded by the recording operation by the outward scanning of nozzle region E (right-pointing allow in FIG. 9). In accordance with the sequential conveyance of the recording medium in the opposite direction to the vertical scanning direction, the nozzle regions A-F shift to execute the recording of band xi. And the recording on band xi is executed by 5 times of scanning (6 times of scanning counting from the 1st scanning for band xi) in sequence of: the recording operation by the homeward scanning (left-pointing allow in FIG. 9) of nozzle region D, the recording operation by the outward scanning (right-pointing allow in FIG. 9) of nozzle region C, the recording operation by the homeward scanning (left-pointing allow in FIG. 9) of nozzle region B, . . . . In this way, same as the recording of band x, the recording of band xi starts with the write start portion by the outward scanning, and the outward scanning and the homeward scanning are alternately repeated until 5 times scanning (6 times scanning counting from the $1^{st}$ scanning for the band xi).

After that, at the time of 7th scanning counted from the first scanning for band xi, the controller controls not to eject ink from nozzles 81 positioned in nozzle region P (the second group of nozzles). Meanwhile, different from the above-described case of band x and band xi, since there is no time interval between the first scanning for band xi and the first scanning of band xii (the recordings are concurrently executed), the joint line will not be conspicuous even without the compensation recording covering the border of band x and band xi.

Since the other configurations are similar to those of the first embodiment, those explanations are omitted.

Next, the ink-jet recording method of the present embodiment will be described.

In the record operation, the controller causes recording head 8 to firstly scan in the horizontal scanning direction from left side to right side. In this outward scanning in the outward path, in order to cause all nozzles 81 positioned in nozzle regions A-F and nozzle region P to eject the ink, the controller controls to allocate the recording data to said nozzles 81.

When the scanning is completed, the controller determines whether the recording operation required for recording all the image is completed, and in the case where the recording operation is completed, the controller controls recording head 8 installed on the carriage 5 to move to the starting point of the outward scanning, and the process is finished.

On the other hand, in the case where the recording operation is not completed, the controller controls to convey the recording medium from the upstream to down stream in the opposite direction to the vertical scanning direction Y by the amount of movement M.

Subsequently, the controller causes recording head 8 from right side to left side in the horizontal scanning direction X. In this homeward scanning in the homeward path, in order not to cause nozzles 81 positioned in nozzle region A, nozzle region P, nozzle region F and a part adjoining to the nozzle region F in nozzle region E to eject the ink, the controller does not allocate the recording data to said nozzles 81. Then, by irradiating the UV ray from the UV ray exposure device onto the ink ejected on the recording medium the ink is hardened and fixed, thus an image is recorded on the recording medium. The controller determines at all times whether the recording operation required for recording the all image is completed, and if not, the controller alternately repeats the outward scanning and the homeward scanning.

Due to the above, when focusing on one band, recording for all pixels in said one band is completed by 5 times (n times) scanning for one band, and by executing the scanning without ejecting the ink at $6^{th}$ scanning {(n+1)th scanning)}, the 6 times (n+1 times) scanning complete the horizontal scanning for forming the a band with respect to said one band by nozzles 81 positioned in nozzle regions A-F (the first group of nozzles). Further, in the $7^{th}$ scanning (record scanning) which is the (n+2)th scanning, compensation recording for compensating the horizontal scanning is executed by nozzles 81 positioned in nozzle region P (the second group of nozzles).

On the other hand, in the case where the recording operation required for recording the all image is completed, the controller terminates the operation.

As described above, according to the present embodiment, even in the case where one band is formed by odd number of times (n times), in the {(n+1)+1}th horizontal scanning, the second group of nozzles 81 execute the recording on the recording pixels of the region having a length (the length of nozzle row α of the second group of nozzles 81) smaller in the vertical scanning direction Y than the conveying amount (amount of movement M) of the recording medium by recording medium conveyance mechanism 12, so that the upstream side boundary in the vertical scanning direction Y of the region recorded by said horizontal scanning is formed within the band width formed by the {1+(n+1)} times of scanning. Due to this, the joint line formed by the time difference between the time of starting or finishing of the recording for a certain band and the time of starting or finishing of the recording for an adjoining band to the certain band becomes inconspicuous.

Further, according to the present embodiment, the portion of start writing begins with outward scanning for every band, the recording is executed by sequentially repeating the outward scanning and the homeward scanning, and a band is formed by the 5 times scanning. Therefore, the combination of the outward scanning and the homeward scanning in the recording operation is the same for the formation of every band. Therefore, in the case of bidirectional recording where both the outward and homeward recording are executed and even the cases where one band is formed by the plural numbered (odd numbered) times of scanning, generation of uneven image of banding, which is caused by the difference such as ink ejection order, time for drying, timing of irradiating the activation energy ray by each band, can be prevented and a high quality image can be formed.

In the present embodiment, although the case is exemplified where one band is formed with 5 times of scanning (record scanning), the required scanning times to form the one band is not restricted to this. For example, the one band may be formed by the scanning of smaller number of times such as 3 times, or by the scanning of greater number of times such as 7 times.

Even in those cases, the main recording is executed with (n+1) times where the number of scanning times n is required for forming one band. Then, the nozzle region of the nozzle head is divided to (n+1) regions, and among the divided regions, the nozzles positioned in the nozzle region of upstream end portion in the vertical scanning direction Y and the nozzle region adjoining to this region, and the nozzle region positioned in the downstream end portion in the vertical scanning direction Y are set to be the regions which are not used in any one of the alternate recording operation in the outward scanning and the homeward scanning.

In the present embodiment, nozzles 81 positioned in nozzle region A nozzle region P, nozzles region F and a part of nozzle region E adjoining to nozzle region F are set to be non-ink ejection nozzles for the recording operation in the homeward scanning. However, the case is also possible, where nozzles 81 positioned in nozzle region A nozzle region P, nozzles region F and a part of nozzle region E adjoining to nozzle region F are set to be non-ink ejection nozzles for the recording operation in the outward scanning.

Figure 10:
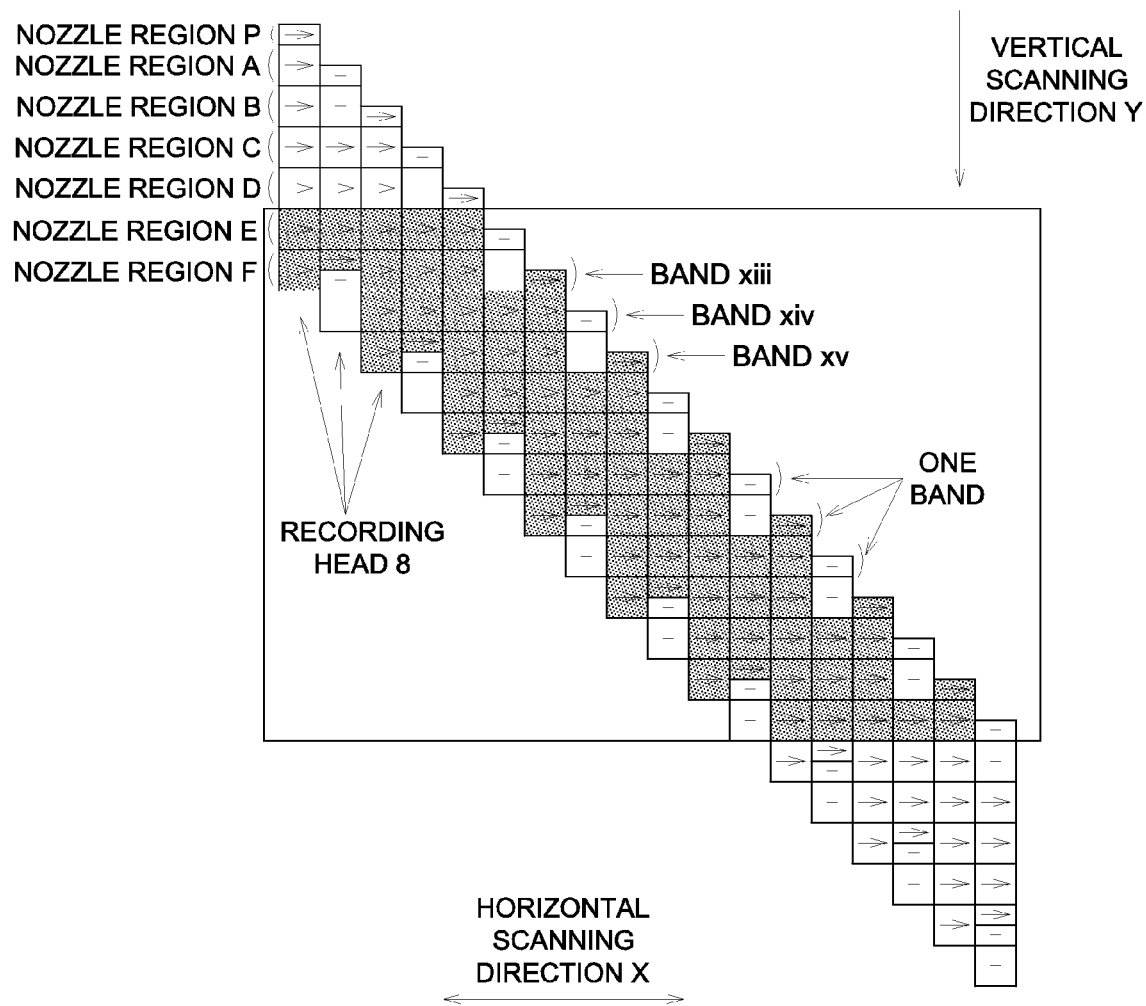
FIG. 10 is a schematic diagram illustrating the corresponding nozzle region of the recording head for recording each band in a modified version of the second embodiment.

Further, in the present embodiment, the case of bidirectional recording system is exemplified where recording operation is carried out both in outward and homeward scanning, however, the ink-jet recording device is not limited to this, but may be one-way recording system where recording is carried out in any one of outward scanning or homeward scanning (refer to FIG. 10).

In this case in the record scanning (for example the outward scanning in FIG. 10), the controller controls to alternately switch the scanning mode between a scanning cycle where the ink is ejected from all the nozzle regions and the other scanning cycle where nozzles 81 positioned in nozzle region A nozzle region P, nozzles region F and a part of nozzle region E adjoining to nozzle region F are prevented from ink ejection. And the controller controls not to allocate the recording data to nozzles 81 positioned in said regions.

Here, by referring to FIG. 10, the recording method in the case of one-way recording system will be described regarding the points different from the bidirectional recording system.

In the one-way recording system, the controller controls to allocate the recording data to all nozzles 81 to eject the ink, and makes the recording head 8 scan (recording scan) from left side to right side in the horizontal scanning direction X (the first scanning). Next, the controller causes the recording medium moves from the upstream side to the down stream side in the opposite direction to the vertical scanning direction Y by the amount of movement M, and causes recording head 8 to move from right hand to left hand in the horizontal scanning direction X to return to the original position.

Subsequently, the controller makes the recording head 8 scan (the second scanning) from left side to right side in the horizontal scanning direction X. In this second scanning, the controller controls not to allocate the recording data to nozzles 81 positioned in nozzle region A nozzle region P, nozzles region F and a part of nozzle region E adjoining to nozzle region F so as not to eject the ink from said nozzles. The controller repeats these operations until completion of the recording operation necessary for recording the all image.

By this, in the portion (pixel) remained without being recorded where the ink is not ejected from nozzles 81 positioned in a part of nozzle region E in the second horizontal scanning and fourth horizontal scanning . . . , ink ejection for recording from nozzles 81 positioned in nozzle region P can be carried out in {(n+1)+1}th scanning.

Namely, when focusing on one band, with 5 times (n times) scanning (record scanning) for one band, the recording for all pixels in said band is completed, and by the 6 times {(n+1) times} scanning the main recording for forming the one band by nozzles 81 positioned in nozzle regions A-F (the first group of nozzles) is completed. Further, in the 7th (n+2) scanning (record scanning), the compensation recording for compensating the main recording is carried out by nozzles 81 positioned in nozzle region P.

Thus, the upstream side boundary in the vertical scanning direction Y of the region recorded by nozzles 81 positioned in nozzle region P comes to more upstream side in the vertical scanning direction Y than a boundary between band xiii and the next band xiv, and the boundary is formed within the width of band xiii.

Similarly to the first embodiment, the present invention is not restricted to the present embodiment.

What is claimed is:

1. An ink-jet recording device comprising:
   a recording head, for ejecting an ink onto a recording medium, configured with a first group of nozzles and a second group of nozzles positioned at an end portion of the recording head, each of the first and second groups of nozzles being provided with a plurality of nozzles arranged in rows along a vertical scanning direction;
   a horizontal scanning device which causes the recording head to scan in a horizontal scanning direction perpendicular to the vertical scanning direction; and
   a vertical scanning device which causes at least one of the recording medium or the recording head to relatively scan in the vertical scanning direction by a predetermined amount of movement M;
   wherein the ink-jet recording device alternately executes the horizontal scanning by the horizontal scanning device and the vertical scanning by the vertical scanning device, and by multiple times of the horizontal scanning and the vertical scanning, forms a band with a width corresponding to the predetermined amount of movement M by the first group of nozzles, to record on the recording medium,
   wherein the horizontal scanning device executes (n+1) times of scanning for forming one band, in cases where a required number of scanning times for forming the one band is n, and the relations $L=M\times(n+1)+\alpha$, and $M>\alpha$ are satisfied, where L is a row length of all the nozzles, and $\alpha$ is a row length of the second group of nozzles, and
   the ink-jet recording device further comprises a controller which causes the second group of nozzles to execute recording at the time of horizontal scanning of {(n+1)+1}th and beyond, and the controller allocates recording data to each of the nozzles so that a border of a region recorded by the horizontal scanning of the second group of nozzles on an upstream side of the relative vertical scanning direction of the recording head relative to the recording medium is formed in an intermediate portion of the width of the one band formed by the first to (n+1)th horizontal scanning.

2. The ink-jet recording device of claim 1, wherein recording pixels which are recorded by the second group of nozzles have not been recorded by the first to (n+1)th horizontal scanning.

3. The ink-jet recording device of claim 1, wherein recording pixels which are recorded by the second group of nozzles are only pixels of a more upstream side in the relative vertical scanning direction than a downstream side border in the relative vertical scanning direction of the band formed by the first to (n+1)th horizontal scanning.

4. The ink-jet recording device of claim 1, wherein in cases where a number of scanning times n required for forming the one band is an even number, and a recording operation is executed both in an outward scanning of outward path and a homeward scanning of homeward path by movements of the horizontal scanning device, the controller does not allocate recording data to the nozzles positioned in different end portions of the recording head according to the recording operation of outward scanning or the recording operation of homeward scanning and controls the nozzles to eject ink.

5. The ink-jet recording device of claim 1, wherein in cases where a number of scanning times n required for forming the one band is an odd number, and recording operation is executed both in an outward scanning of outward path and a homeward scanning of homeward path by movements of the horizontal scanning device, the controller does not allocate recording data to the nozzles positioned in both end portions of the recording head during the recording operation of one of the outward scanning and the homeward scanning and controls the nozzles to eject ink.

6. The ink-jet recording device of claim 1, wherein the ink is an activation energy hardening type ink which comprises an activation energy hardening compound and is hardened by exposure to an activation energy ray.

7. The ink-jet recording device of claim 2, wherein the ink is an activation energy hardening type ink which comprises an activation energy hardening compound and is hardened by exposure to an activation energy ray.

8. The ink-jet recording device of claim 3, wherein the ink is an activation energy hardening type ink which comprise an activation energy hardening compound and is hardened by exposure to an activation energy ray.

9. The ink-jet recording device of claim 4, wherein the ink is an activation energy hardening type ink which comprises an activation energy hardening compound and is hardened by exposure to an activation energy ray.

10. The ink-jet recording device of claim 5, wherein the ink is an activation energy hardening type ink which comprises an activation energy hardening compound and is hardened by exposure to an activation energy ray.

11. An ink-jet recording device comprising:
a recording head, for ejecting an ink onto a recording medium, configured with a first group of nozzles and a second group of nozzles positioned at an end portion of the recording head, each of the first and second groups of nozzles being provided with a plurality of nozzles arranged in rows along a vertical scanning direction;
a horizontal scanning device which causes the recording head to scan in a horizontal scanning direction perpendicular to the vertical scanning direction; and
a vertical scanning device which causes at least one the recording medium or the recording head to relatively scan in the vertical scanning direction by a predetermined amount of movement M;
wherein the ink-jet recording device alternately executes the horizontal scanning by the horizontal scanning device and the vertical scanning by the vertical scanning device, and by multiple times of the horizontal scanning and the vertical scanning, forms a band with a width corresponding to the predetermined amount of movement M by the first group of nozzles, to record on the recording medium,
wherein in cases where a required number of scanning times for forming the one band is n, and the relations $L=M\times(n+1)+\alpha$, and $M>\alpha$ are satisfied, where L is a row length of all the nozzles, and $\alpha$ is a row length of the second group of nozzles, and
the ink-jet recording device further comprises a controller which causes the second group of nozzles to execute recording at the time of horizontal scanning of (n+1)th and beyond, and the controller allocates recording data to each of the nozzles so that a border of a region recorded by the horizontal scanning of the second group of nozzles on an upstream side of the relative vertical scanning direction of the recording head relative to the recording medium is formed in an intermediate portion of the width of the one band formed by the first to n-th horizontal scanning.

12. The ink-jet recording device of claim 11, wherein the ink is an activation energy hardening type ink which comprises an activation energy hardening compound and is hardened by exposure to an activation energy ray.

13. An ink-jet recording method comprising:
a vertical scanning process to cause at least one of a recording medium or a recording head to relatively scan in a vertical scanning direction by a predetermined amount of movement M;
a horizontal scanning process to cause the recording head to scan in a horizontal scanning direction perpendicular to the vertical scanning direction; and
a recording process to eject ink from a first group of nozzles, and a second group of nozzles positioned at an end portion of the recording head, each of the first and second groups of nozzles being provided with a plurality of nozzles in rows along a vertical scanning direction, and to alternately execute the horizontal scanning by a horizontal scanning device and the vertical scanning by a vertical scanning device, and by multiple times of the horizontal scanning and the vertical scanning, to form one band with a width corresponding to the predetermined amount of movement M by a first group of nozzles, to record on the recording medium,
wherein in the horizontal scanning process, (n+1) times of scanning is executed for forming the one band, in cases where required number of scanning times for forming the one band is n, and the relations $L=M\times(n+1)+\alpha$, and $M>\alpha$ are satisfied, where L is a row length of all the nozzles, and a is a row length of the second group of nozzles, and
wherein in the recording process, the second group of nozzles executes the recording at the time of horizontal scanning of {(n+1)+1}th and beyond, and recording data is allocated to each of the nozzles so that a border of a region recorded by the horizontal scanning of the second group of nozzles on an upstream side of the relative vertical scanning direction of the recording head relative to the recording medium as formed in an intermediate portion of the width of the one band formed by the first to (n +1)th horizontal scanning.

14. The ink-jet recording device of claim 13, wherein the ink is an activation energy hardening type ink which comprises an activation energy hardening compound and is hardened by exposure to an activation energy ray.

15. An ink-jet recording method comprising:
- a vertical scanning process to cause at least one of a recording medium or a recording head to relatively scan in a vertical scanning direction by a predetermined amount of movement M;
- a horizontal scanning process to cause the recording head to scan in a horizontal scanning direction perpendicular to the vertical scanning direction; and
- a recording process to eject ink from a first group of nozzles, and a second group of nozzles positioned at an end portion of the recording head, each of the first and second groups of nozzles being provided with a plurality of nozzles in rows along a vertical scanning direction, and to alternately execute the horizontal scanning by a horizontal scanning device and the vertical scanning by a vertical scanning device, and by multiple times of the horizontal scanning and the vertical scanning, to form one band with a width corresponding to the predetermined amount of movement M by a first group of nozzles, to record on the recording medium,
- wherein in cases where required number of scanning times for forming the one band is n, the relations $L=M\times(n+1)+\alpha$, and $M>\alpha$ are satisfied, where L is a row length of all the nozzles, and $\alpha$ is a row length of the second group of nozzles, and in the recording process, the second group of nozzles executes the recording at the horizontal scanning of (n+1)th and beyond, and recording data is allocated to each of the nozzles so that a border of a region recorded by the horizontal scanning on an upstream side of the relative vertical scanning direction of the inkjet head relative to the recording medium is formed in an intermediate portion of a width of the one band formed by the first to n-th horizontal scanning.

16. The ink-jet recording device of claim 15, wherein the ink is an activation energy hardening type ink which comprises an activation energy hardening compound and is hardened by exposure to an activation energy ray.

* * * * *